(12) United States Patent
Hendrix et al.

(10) Patent No.: US 7,895,103 B1
(45) Date of Patent: *Feb. 22, 2011

(54) SYSTEM AND METHOD FOR FUNDING AN ORGANIZATION

(75) Inventors: Brian Joseph Hendrix, Lexington, SC (US); C. Mitch Branton, Irmo, SC (US); Wesley Todd King, Chapin, SC (US)

(73) Assignee: LTI Agency, LLC, Irmo, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/190,178

(22) Filed: Aug. 12, 2008

(51) Int. Cl.
*G06Q 40/00* (2006.01)

(52) U.S. Cl. .................... 705/35; 705/36 R; 705/36 T; 705/37; 705/4

(58) Field of Classification Search .................... 705/4, 705/35–37
See application file for complete search history.

(56) References Cited

U.S. PATENT DOCUMENTS

| | | | |
|---|---|---|---|
| 4,839,804 A | 6/1989 | Roberts et al. | |
| 6,330,541 B1 | 12/2001 | Meyer et al. | |
| 7,451,104 B1 * | 11/2008 | Hendrix et al. | 705/35 |
| 7,558,757 B2 * | 7/2009 | Conroy et al. | 705/38 |
| 7,747,518 B2 * | 6/2010 | Caballero et al. | 705/38 |
| 7,805,352 B2 * | 9/2010 | Mercier et al. | 705/36 R |
| 2002/0007332 A1 | 1/2002 | Johnson et al. | |
| 2002/0035489 A1 | 3/2002 | Herman et al. | |
| 2003/0074232 A1 | 4/2003 | Lee | |
| 2003/0105690 A1 | 6/2003 | Brown et al. | |
| 2004/0019506 A1 * | 1/2004 | Struchtemeyer et al. | 705/4 |
| 2004/0064391 A1 | 4/2004 | Lange | |
| 2004/0088201 A1 * | 5/2004 | Lang | 705/4 |
| 2004/0167807 A1 * | 8/2004 | Fitzsimmons et al. | 705/4 |
| 2004/0176989 A1 | 9/2004 | Darr | |
| 2004/0181436 A1 * | 9/2004 | Lange | 705/4 |
| 2004/0199446 A1 | 10/2004 | Lange | |
| 2004/0205012 A1 * | 10/2004 | O'Connor | 705/36 |
| 2004/0225537 A1 | 11/2004 | Darr | |
| 2004/0267647 A1 * | 12/2004 | Brisbois | 705/35 |
| 2005/0086144 A1 * | 4/2005 | Lang | 705/35 |
| 2005/0149434 A1 * | 7/2005 | Selby | 705/38 |
| 2005/0187801 A1 | 8/2005 | Phelps | |
| 2007/0038481 A1 * | 2/2007 | Darr | 705/4 |
| 2007/0198381 A1 * | 8/2007 | Ettmueller | 705/35 |
| 2007/0226154 A1 * | 9/2007 | Palmieri | 705/36 T |
| 2008/0215500 A1 * | 9/2008 | De La Motte | 705/36 R |
| 2009/0030853 A1 * | 1/2009 | De La Motte | 705/36 R |

(Continued)

FOREIGN PATENT DOCUMENTS

| | | | |
|---|---|---|---|
| WO | WO 2005/020000 A2 * | 3/2005 | |
| WO | WO 2007/079132 A2 * | 7/2007 | |

*Primary Examiner*—Narayanswamy Subramanian
(74) *Attorney, Agent, or Firm*—Michael A. Mann; Nexsen Pruet, LLC

(57) ABSTRACT

A system and method and method for generating substantial net positive cash flows to fund organizations by initiating life insurance policies through asset-backed security transactions with no out-of-pocket expense to either the organizations or to the insureds, requiring no use of policies' cash value or transfer of ownership or beneficiary of the life insurance policies, and providing guaranteed funding to the organizations regardless of when deaths occur while keeping the original insurable interest intact, thereby creating a marketable, tradable uncorrelated security.

61 Claims, 14 Drawing Sheets

U.S. PATENT DOCUMENTS

| | | | |
|---|---|---|---|
| 2009/0037226 A1* | 2/2009 | Radin | 705/4 |
| 2009/0157434 A1* | 6/2009 | Darr et al. | 705/4 |
| 2009/0271326 A1* | 10/2009 | Finfrock et al. | 705/36 R |
| 2010/0063853 A1* | 3/2010 | Foti et al. | 705/4 |
| 2010/0094667 A1* | 4/2010 | Darr | 705/4 |
| 2010/0121785 A1* | 5/2010 | Lyons et al. | 705/36 R |
| 2010/0262438 A1* | 10/2010 | Lange et al. | 705/4 |

* cited by examiner

| PRESCREENING | | | UNDERWRITING | | | | | AGE | MALE | | | FEMALE | | | TOTAL |
| NON-TOBACCO, <80 YR. OLD VOLUNTEERS | | PASSES UW | STD | ABOVE STD | PREF'D | PREF'D + | | | MPPNT | MPNT | MSNT | FPPNT | FPNT | FSNT | |
| MALE | FEMALE | | | | | | | | | | | | | | |
| 2 | 0 | 75% | 70% | 30% | 50% | 50% | 21 | 0 | 0 | 1 | 0 | 0 | 0 | 1 |
| 2 | 0 | 75% | 70% | 30% | 50% | 50% | 22 | 0 | 0 | 1 | 0 | 0 | 0 | 1 |
| 5 | 3 | 75% | 70% | 30% | 50% | 50% | 23 | 1 | 1 | 3 | 0 | 0 | 2 | 7 |
| 0 | 3 | 75% | 70% | 30% | 50% | 50% | 24 | 0 | 0 | 0 | 0 | 0 | 2 | 2 |
| 5 | 2 | 75% | 70% | 30% | 50% | 50% | 25 | 1 | 1 | 3 | 0 | 0 | 1 | 6 |
| 5 | 2 | 75% | 70% | 30% | 50% | 50% | 26 | 1 | 1 | 3 | 0 | 0 | 1 | 6 |
| 2 | 0 | 75% | 70% | 30% | 50% | 50% | 27 | 0 | 0 | 1 | 0 | 0 | 1 | 2 |
| 2 | 0 | 75% | 70% | 30% | 50% | 50% | 28 | 0 | 0 | 1 | 0 | 0 | 0 | 1 |
| 3 | 2 | 75% | 70% | 30% | 50% | 50% | 29 | 0 | 0 | 2 | 0 | 0 | 0 | 2 |
| 3 | 2 | 75% | 70% | 30% | 50% | 50% | 30 | 0 | 0 | 2 | 0 | 0 | 1 | 3 |
| 5 | 2 | 75% | 70% | 30% | 50% | 50% | 31 | 1 | 1 | 3 | 0 | 0 | 1 | 6 |
| 3 | 3 | 75% | 70% | 30% | 50% | 50% | 32 | 1 | 1 | 2 | 0 | 0 | 1 | 3 |
| 17 | 8 | 75% | 70% | 30% | 50% | 50% | 33 | 1 | 1 | 9 | 0 | 0 | 2 | 14 |
| 12 | 5 | 75% | 70% | 30% | 50% | 50% | 34 | 1 | 1 | 6 | 0 | 0 | 4 | 10 |
| 10 | 2 | 75% | 70% | 30% | 50% | 50% | 35 | 1 | 1 | 5 | 0 | 0 | 3 | 13 |
| 13 | 10 | 75% | 70% | 30% | 50% | 50% | 36 | 1 | 1 | 7 | 0 | 0 | 1 | 14 |
| 13 | 7 | 75% | 70% | 30% | 50% | 50% | 37 | 1 | 1 | 7 | 0 | 0 | 5 | 10 |
| 8 | 8 | 75% | 70% | 30% | 50% | 50% | 38 | 1 | 1 | 4 | 0 | 0 | 3 | 13 |
| 17 | 5 | 75% | 70% | 30% | 50% | 50% | 39 | 2 | 2 | 9 | 0 | 0 | 4 | 18 |
| 18 | 12 | 75% | 70% | 30% | 50% | 50% | 40 | 2 | 2 | 10 | 0 | 0 | 3 | 20 |
| 10 | 5 | 75% | 70% | 30% | 50% | 50% | 41 | 2 | 2 | 5 | 0 | 1 | 6 | 12 |
| 18 | 0 | 75% | 70% | 30% | 50% | 50% | 42 | 2 | 2 | 10 | 0 | 1 | 3 | 22 |
| 20 | 5 | 75% | 70% | 30% | 50% | 50% | 43 | 1 | 1 | 10 | 1 | 1 | 0 | 19 |
| 22 | 5 | 75% | 70% | 30% | 50% | 50% | 44 | 2 | 2 | 11 | 1 | 1 | 3 | 15 |
| 7 | 7 | 75% | 70% | 30% | 50% | 50% | 45 | 2 | 2 | 3 | 1 | 1 | 3 | 10 |
| 18 | 7 | 75% | 70% | 30% | 50% | 50% | 46 | 2 | 2 | 10 | 1 | 1 | 3 | 19 |
| 22 | 8 | 75% | 70% | 30% | 50% | 50% | 47 | 3 | 3 | 11 | 1 | 1 | 3 | 20 |
| 25 | 18 | 75% | 70% | 30% | 50% | 50% | 48 | 3 | 3 | 13 | 1 | 1 | 3 | 24 |
| 28 | | 75% | 70% | 30% | 50% | 50% | 49 | 3 | 3 | 15 | 1 | 1 | 4 | 27 |
| 25 | | 75% | 70% | 30% | 50% | 50% | 50 | 3 | 3 | 13 | 2 | 2 | 10 | 33 |

FIG. 5A

| | | | | | | | | |
|---|---|---|---|---|---|---|---|---|
| 51 | 4 | 4 | 18 | | 1 | 1 | 6 | 34 |
| 52 | 3 | 3 | 16 | | 1 | 1 | 4 | 28 |
| 53 | 3 | 3 | 13 | | 2 | 2 | 8 | 31 |
| 54 | 4 | 4 | 19 | | 1 | 1 | 6 | 35 |
| 55 | 4 | 4 | 19 | | 1 | 1 | 3 | 32 |
| 56 | 4 | 4 | 16 | | 2 | 2 | 11 | 39 |
| 57 | 3 | 3 | 15 | | 1 | 1 | 6 | 29 |
| 58 | 4 | 4 | 15 | | 3 | 3 | 13 | 40 |
| 59 | 3 | 3 | 21 | | 3 | 3 | 14 | 49 |
| 60 | 5 | 5 | 16 | | 2 | 2 | 8 | 34 |
| 61 | 5 | 5 | 24 | | 1 | 1 | 7 | 43 |
| 62 | 6 | 6 | 25 | | 2 | 2 | 11 | 50 |
| 63 | 6 | 6 | 29 | | 2 | 2 | 9 | 53 |
| 64 | 5 | 5 | 32 | | 3 | 3 | 15 | 63 |
| 65 | 6 | 6 | 30 | | 1 | 1 | 6 | 47 |
| 66 | 6 | 6 | 36 | | 2 | 2 | 9 | 59 |
| 67 | 4 | 4 | 36 | | 2 | 2 | 9 | 59 |
| 68 | 5 | 5 | 35 | | 2 | 2 | 10 | 58 |
| 69 | 4 | 4 | 28 | | 1 | 1 | 10 | 48 |
| 70 | 4 | 4 | 34 | | 1 | 1 | 6 | 50 |
| 71 | 4 | 4 | 30 | | 1 | 1 | 4 | 42 |
| 72 | 4 | 4 | 32 | | 1 | 1 | 9 | 50 |
| 73 | 5 | 5 | 32 | | 0 | 1 | 7 | 47 |
| 74 | 3 | 3 | 33 | | 1 | 1 | 11 | 52 |
| 75 | 2 | 2 | 39 | | 1 | 1 | 9 | 56 |
| 76 | 1 | 1 | 44 | | 1 | 1 | 9 | 62 |
| 77 | 1 | 1 | 28 | | 1 | 1 | 6 | 39 |
| 78 | 1 | 1 | 19 | | 0 | 0 | 3 | 25 |
| 79 | 1 | 2 | 16 | | 0 | 0 | 3 | 21 |
| 80 | 1 | 2 | 26 | | 0 | 0 | 3 | 32 |
| | 131 | 155 | 914 | 50 | 57 | 300 | 1,607 |
| | | 1,200 | | 407 | | | |

| | | | | | |
|---|---|---|---|---|---|
| 35 | 12 | 75% | 70% | 30% | 50% |
| 30 | 8 | 75% | 70% | 30% | 50% |
| 25 | 15 | 75% | 70% | 30% | 50% |
| 37 | 12 | 75% | 70% | 30% | 50% |
| 37 | 5 | 75% | 70% | 30% | 50% |
| 32 | 22 | 75% | 70% | 30% | 50% |
| 30 | 12 | 74% | 70% | 30% | 50% |
| 30 | 25 | 73% | 70% | 30% | 50% |
| 42 | 28 | 72% | 70% | 30% | 50% |
| 33 | 17 | 71% | 70% | 30% | 50% |
| 50 | 13 | 70% | 71% | 29% | 49% |
| 51 | 23 | 69% | 72% | 28% | 48% |
| 60 | 18 | 68% | 73% | 27% | 47% |
| 66 | 30 | 67% | 74% | 26% | 46% |
| 61 | 13 | 66% | 75% | 25% | 45% |
| 73 | 18 | 65% | 76% | 24% | 44% |
| 75 | 18 | 64% | 77% | 23% | 43% |
| 73 | 18 | 63% | 78% | 22% | 42% |
| 58 | 20 | 62% | 79% | 21% | 41% |
| 71 | 20 | 61% | 80% | 20% | 40% |
| 63 | 13 | 60% | 81% | 19% | 39% |
| 68 | 8 | 59% | 82% | 18% | 38% |
| 68 | 18 | 58% | 83% | 17% | 37% |
| 70 | 15 | 57% | 84% | 16% | 36% |
| 83 | 23 | 56% | 85% | 15% | 35% |
| 96 | 18 | 55% | 86% | 14% | 34% |
| 66 | 20 | 53% | 87% | 13% | 33% |
| 48 | 15 | 49% | 88% | 12% | 32% |
| 48 | 8 | 45% | 89% | 11% | 31% |
| 83 | 10 | 35% | 90% | 10% | 30% |
| 2,000 | 619 | | | | |
| | 2,619 | | | | |

| MSNT 58 | | | | |
|---|---|---|---|---|
| PREMIUM FOR POLICY TOTAL | $141,009.10 5.97% | | | |
| YEAR | CUMULATIVE DEATHS | # OF DEATHS | PROJECTED CASH FLOW | IRR IN YEAR POLICY MATURES |
| 0 | 0 | 0 | $(141,009,100.00) | |
| 1 | 2 | 2 | $1,000,000 | 254.6% |
| 2 | 5 | 3 | $1,500,000 | 88.3% |
| 3 | 9 | 4 | $2,000,000 | 52.5% |
| 4 | 14 | 5 | $2,500,000 | 37.2% |
| 5 | 20 | 6 | $3,000,000 | 28.8% |
| 6 | 27 | 7 | $3,500,000 | 23.5% |
| 7 | 36 | 9 | $4,500,000 | 19.8% |
| 8 | 46 | 10 | $5,000,000 | 17.1% |
| 9 | 57 | 11 | $5,500,000 | 15.1% |
| 10 | 70 | 13 | $6,500,000 | 13.5% |
| 11 | 86 | 16 | $8,000,000 | 12.2% |
| 12 | 104 | 18 | $9,000,000 | 11.1% |
| 13 | 125 | 21 | $10,500,000 | 10.2% |
| 14 | 148 | 23 | $11,500,000 | 9.5% |
| 15 | 173 | 25 | $12,500,000 | 8.8% |
| 16 | 202 | 29 | $14,500,000 | 8.2% |
| 17 | 233 | 31 | $15,500,000 | 7.7% |
| 18 | 266 | 33 | $16,500,000 | 7.3% |
| 19 | 300 | 34 | $17,000,000 | 6.9% |
| 20 | 336 | 36 | $18,000,000 | 6.5% |
| 21 | 374 | 38 | $19,000,000 | 6.2% |
| 22 | 414 | 40 | $20,000,000 | 5.9% |
| 23 | 456 | 42 | $21,000,000 | 5.7% |
| 24 | 499 | 43 | $21,500,000 | 5.4% |
| 25 | 543 | 44 | $22,000,000 | 5.2% |
| 26 | 587 | 43 | $22,000,000 | 5.0% |
| 27 | 630 | 43 | $21,500,000 | 4.8% |
| 28 | 673 | 43 | $21,500,000 | 4.6% |
| 29 | 715 | 42 | $21,000,000 | 4.5% |
| 30 | 755 | 40 | $20,000,000 | 4.3% |
| 31 | 793 | 38 | $19,000,000 | 4.2% |
| 32 | 828 | 35 | $17,500,000 | 4.0% |
| 33 | 859 | 31 | $15,500,000 | 3.9% |
| 34 | 886 | 27 | $13,500,000 | 3.8% |
| 35 | 910 | 24 | $12,000,000 | 3.7% |
| 36 | 930 | 20 | $10,000,000 | 3.6% |
| 37 | 946 | 16 | $8,000,000 | 3.5% |
| 38 | 959 | 13 | $6,500,000 | 3.4% |
| 39 | 970 | 11 | $5,500,000 | 3.3% |
| 40 | 978 | 8 | $4,000,000 | 3.2% |
| 41 | 985 | 7 | $3,500,000 | 3.1% |
| 42 | 990 | 5 | $2,500,000 | 3.1% |
| 43 | 993 | 3 | $1,500,000 | 3.0% |
| 44 | 995 | 2 | $1,000,000 | 2.9% |
| 45 | 997 | 2 | $1,000,000 | 2.9% |
| 46 | 998 | 1 | $500,000 | 2.8% |
| 47 | 999 | 1 | $500,000 | 2.7% |
| 48 | 999 | 0 | - | |
| 49 | 999 | 0 | - | |
| 50 | 999 | 0 | | |
| 51 | 1000 | 1 | $500,000 | 2.5% |

| AGE/CLASS | IRR WITH UNADJUSTED PREMIUM | IRR WITH 6% REDUCTION OF PREMIUM | COST OF POLICY WITH UNADJUSTED PREMIUM | COST OF POLICY WITH 6% PREMIUM REDUCTION |
|---|---|---|---|---|
| MSNT 28 | 4.99% | 5.15% | $26,211 | $24,638 |
| MPNT 28 | 4.95% | 5.09% | $22,405 | $21,060 |
| MPPNT 28 | 4.98% | 5.29% | $18,599 | $17,483 |
| MST 28 | 4.80% | 4.98% | $36,213 | $34,041 |
| MPT 28 | 4.59% | 4.75% | $33,390 | $31,387 |
| MSNT 38 | 5.32% | 5.51% | $35,682 | $33,541 |
| MPNT 38 | 5.24% | 5.42% | $31,585 | $29,690 |
| MPPNT 38 | 5.40% | 5.57% | $27,488 | $25,839 |
| MST 38 | 4.83% | 5.06% | $52,487 | $49,337 |
| MPT 38 | 4.58% | 4.78% | $49,156 | $46,206 |
| MSNT 48 | 5.72% | 5.98% | $49,296 | $46,339 |
| MPNT 48 | 5.79% | 6.03% | $41,920 | $39,405 |
| MPPNT 48 | 6.20% | 6.42% | $34,544 | $32,471 |
| MST 48 | 4.59% | 4.87% | $79,158 | $74,408 |
| MPT 48 | 4.46% | 4.71% | $72,036 | $67,714 |
| MSNT 58 | 5.97% | 6.31% | $141,009 | $132,549 |
| MPNT 58 | 6.29% | 6.60% | $114,597 | $107,721 |
| MPPNT 58 | 7.18% | 7.48% | $88,184 | $82,893 |
| MST 58 | 4.13% | 4.50% | $229,472 | $215,704 |
| MPT 58 | 4.26% | 4.58% | $203,144 | $190,956 |
| MSNT 68 | 5.81% | 6.26% | $202,352 | $190,211 |
| MPNT 68 | 6.27% | 6.67% | $167,620 | $157,563 |
| MPPNT 68 | 7.30% | 7.69% | $132,888 | $124,915 |
| MST 68 | 3.32% | 3.81% | $316,722 | $297,719 |
| MPT 68 | 3.61% | 4.04% | $283,770 | $266,743 |
| MSNT 78 | 4.72% | 5.36% | $303,203 | $285,011 |
| MPNT 78 | 5.25% | 5.80% | $263,016 | $247,235 |
| MPPNT 78 | 6.21% | 6.73% | $222,282 | $209,459 |
| MST 78 | 1.56% | 2.24% | $430,885 | $405,032 |
| MPT 78 | 1.73% | 2.30% | $411,335 | $386,674 |

FIG. 8

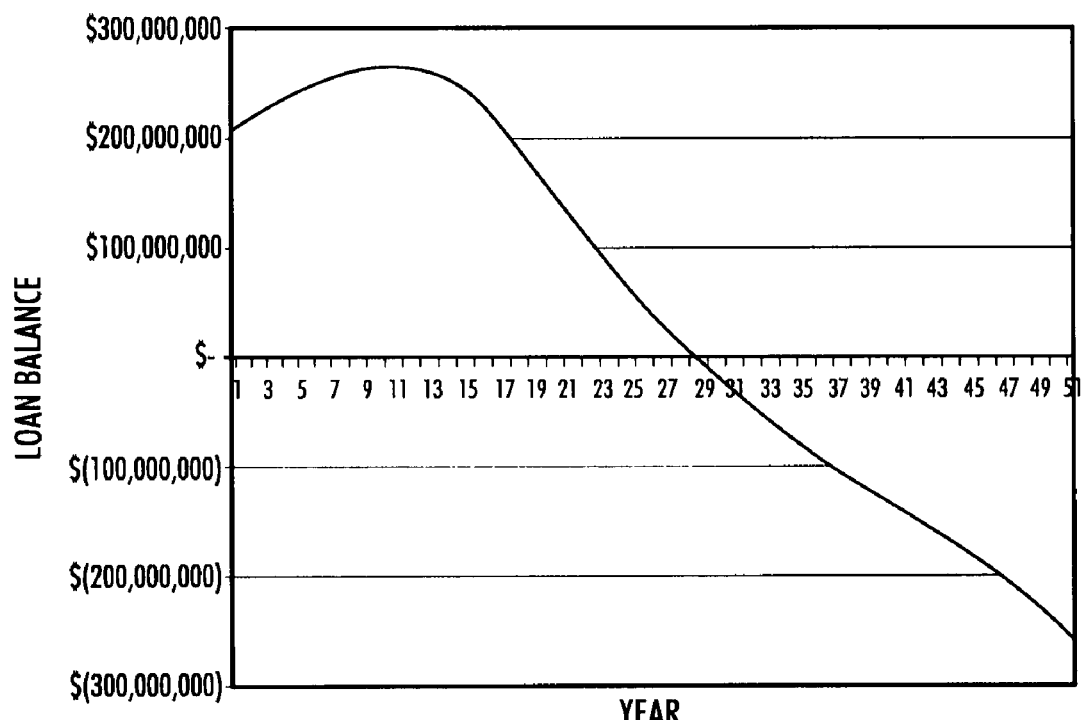
FIG. 9A
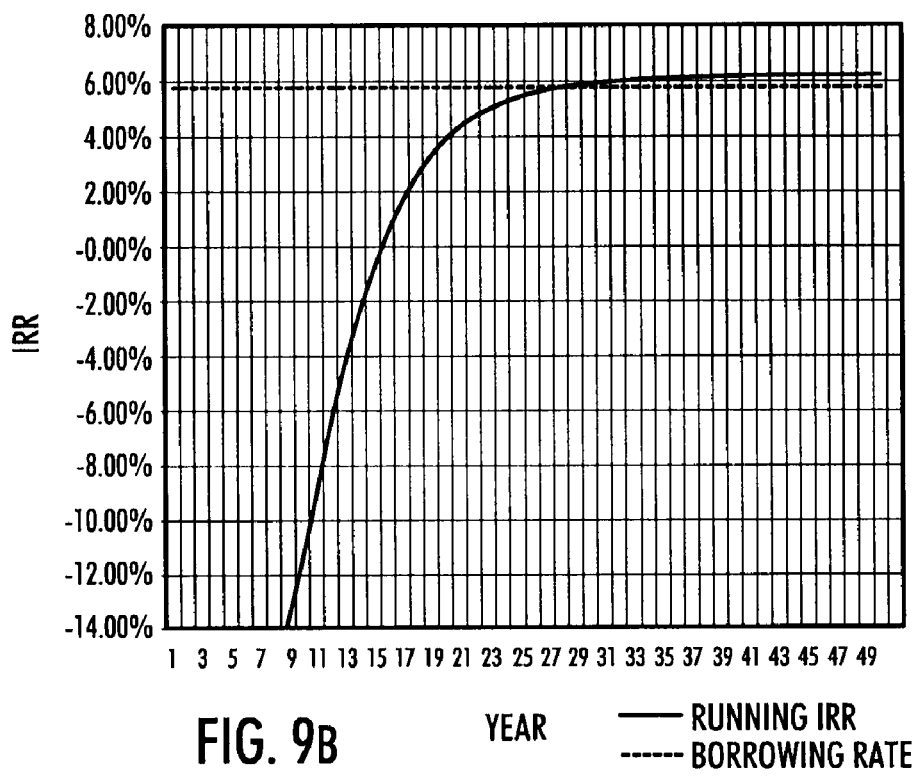
FIG. 9B  YEAR  —— RUNNING IRR
------ BORROWING RATE

| SCENARIOS USING BASE CASE | ANN. AMT. TO CHARITY | % OF DBs | TOTAL $ TO CHARITY | DURATION OF DEBT |
|---|---|---|---|---|
| GOALS = | $500,000 | 20% | $100 MILL | 20-50 YRS |
| CURRENT EX. MIX | | | | |
| BASE CASE | $500,000 | 6.7% | 46 MILL | 49 YRS. |
| | | | | |
| BORROWING COST | | | | |
| (ILLUSTRATED BY | | | | |
| DECR. SPREADS) | | | | |
| -10 bps | $500,000 | 11.7% | 80 MILL | 40 YRS. |
| -20 bps | $500,000 | 15.3% | 140 MILL | 36 YRS. |
| -30 bps | $500,000 | 18.3% | 125 MILL | 33 YRS. |
| -40 bps | $500,000 | 20.8% | 142 MILL | 32 YRS. |
| -50 bps | $500,000 | 23.2% | 158 MILL | 30 YRS. |
| | | | | |
| INS. PREM. ADJ. | | | | |
| -3% | $500,000 | 15.9% | 109 MILL | 35 YRS. |
| -5% | $500,000 | 20.2% | 138 MILL | 32 YRS. |
| -7% | $500,000 | 23.9% | 163 MILL | 30 YRS. |
| -10% | $500,000 | 28.9% | 197 MILL | 28 YRS. |
| | | | | |
| BC & PREM. ADJ. | | | | |
| -10 bps/-3% | $500,000 | 18.8% | 129 MILL | 36 YRS. |
| -30 bps/-3% | $500,000 | 23.6% | 162 MILL | 30 YRS. |
| -50 bps/-3% | $500,000 | 27.7% | 189 MILL | 28 YRS. |
| -10 bps/-5% | $500,000 | 22.6% | 155 MILL | 31 YRS. |
| -30 bps/-5% | $500,000 | 26.8% | 183 MILL | 28 YRS. |
| -50 bps/-5% | $500,000 | 30.5% | 208 MILL | 27 YRS. |
| OR -50 BPS/-5% | (RAISE ANNUAL) 2 MILL | 19.1% | 130 MILL | 41 YRS. |

| 30-YR IRR | 35-YR IRR | 40-YR IRR | 45-YR IRR | 50-YR IRR | AGE/CLASS |
|---|---|---|---|---|---|
| 0.10% | 2.00% | 3.31% | 4.22% | 4.81% | MSNT 35 |
| 0.48% | 2.31% | 3.58% | 4.45% | 4.99% | MSNT 36 |
| 0.80% | 2.59% | 3.81% | 4.64% | 5.14% | MSNT 37 |
| 1.11% | 2.86% | 4.03% | 4.81% | 5.27% | MSNT 38 |
| 1.47% | 3.14% | 4.27% | 5.01% | 5.42% | MSNT 39 |
| 1.85% | 3.46% | 4.53% | 5.21% | 5.58% | MSNT 40 |
| 2.16% | 3.72% | 4.75% | 5.38% | 5.71% | MSNT 41 |
| 2.48% | 3.99% | 4.97% | 5.56% | 5.84% | MSNT 42 |
| 2.78% | 4.25% | 5.18% | 5.71% | 5.95% | MSNT 43 |
| 3.08% | 4.49% | 5.37% | 5.85% | 6.06% | MSNT 44 |
| 3.42% | 4.77% | 5.59% | 6.02% | 6.19% | MSNT 45 |
| 3.59% | 4.90% | 5.68% | 6.06% | 6.20% | MSNT 46 |
| 3.82% | 5.08% | 5.80% | 6.13% | 6.24% | MSNT 47 |
| 4.02% | 5.23% | 5.89% | 6.18% | 6.27% | MSNT 48 |
| 4.22% | 5.37% | 5.98% | 6.23% | 6.30% | MSNT 49 |
| 4.40% | 5.49% | 6.05% | 6.25% | 6.31% | MSNT 50 |
| 4.65% | 5.67% | 6.16% | 6.33% | 6.37% | MSNT 51 |
| 4.85% | 5.76% | 6.20% | 6.34% | 6.37% | MSNT 52 |
| 5.00% | 5.89% | 6.27% | 6.38% | 6.40% | MSNT 53 |
| 5.20% | 6.00% | 6.33% | 6.41% | 6.43% | MSNT 54 |
| 5.34% | 6.08% | 6.35% | 6.42% | 6.43% | MSNT 55 |
| 5.52% | 6.18% | 6.40% | 6.46% | 6.46% | MSNT 56 |
| 5.67% | 6.26% | 6.44% | 6.48% | 6.49% | MSNT 57 |
| 5.84% | 6.35% | 6.50% | 6.53% | 6.53% | MSNT 58 |
| 5.93% | 6.37% | 6.49% | 6.51% | 6.51% | MSNT 59 |
| 6.04% | 6.41% | 6.51% | 6.52% | 6.52% | MSNT 60 |
| 6.11% | 6.43% | 6.50% | 6.51% | 6.51% | MSNT 61 |
| 6.20% | 6.46% | 6.52% | 6.52% | 6.53% | MSNT 62 |
| 6.25% | 6.46% | 6.51% | 6.51% | 6.51% | MSNT 63 |
| 6.29% | 6.47% | 6.50% | 6.50% | 6.50% | MSNT 64 |
| 6.35% | 6.50% | 6.52% | 6.52% | 6.52% | MSNT 65 |
| 6.30% | 6.41% | 6.43% | 6.43% | 6.43% | MSNT 66 |
| 6.25% | 6.33% | 6.34% | 6.34% | 6.34% | MSNT 67 |
| 6.19% | 6.26% | 6.27% | 6.27% | 6.27% | MSNT 68 |
| 6.14% | 6.19% | 6.20% | 6.20% | 6.20% | MSNT 69 |
| 6.10% | 6.14% | 6.14% | 6.14% | 6.14% | MSNT 70 |
| 6.01% | 6.04% | 6.04% | 6.04% | 6.04% | MSNT 71 |
| 5.88% | 5.90% | 5.90% | 5.90% | 5.90% | MSNT 72 |
| 5.77% | 5.79% | 5.79% | 5.79% | 5.79% | MSNT 73 |
| 5.72% | 5.74% | 5.74% | 5.74% | 5.74% | MSNT 74 |
| 5.71% | 5.71% | 5.71% | 5.71% | 5.71% | MSNT 75 |
| 5.47% | 5.47% | 5.47% | 5.47% | 5.47% | MSNT 76 |
| 5.23% | 5.24% | 5.24% | 5.24% | 5.24% | MSNT 77 |
| 4.97% | 4.98% | 4.98% | 4.98% | 4.98% | MSNT 78 |
| 4.55% | 4.55% | 4.55% | 4.55% | 4.55% | MSNT 79 |
| 4.30% | 4.30% | 4.30% | 4.30% | 4.30% | MSNT 80 |

SYSTEM AND METHOD FOR FUNDING AN ORGANIZATION

CROSS REFERENCE TO RELATED PATENTS

The priority benefit of U.S. non-provisional patent application Ser. No. 11/769,269, filed Jun. 27, 2007, is claimed. The present application is related to U.S. patent application Ser. No. 11/753,623, filed May 25, 2007. The specifications of application Ser. Nos. 11/753,623 and 11/769,269 are hereby incorporated in their entireties by reference.

BACKGROUND OF THE INVENTION

The present invention relates to a system and method for providing funding to organizations such as non-profit organizations, for-profit corporations, and governmental bodies that are seeking to provide alternative funding from their regular sources such as donations, grants, profits or taxes.

Organizations raise money in various ways. For-profit and some not-for-profit corporations sell goods and services to generate cash flow to fund their operations. Governments exercise their franchise to tax citizens and businesses to generate revenues. Non-profit organizations such as charities depend on volunteers, donations and grants to carry out their missions. Particularly for charities, but for other organizations as well, there is often a need for an alternative source of revenue, or for a regular, more-dependable source of revenue.

Corporations may also need additional revenue to fund retirement and/or health benefit obligations. For example, for-profit corporations have expenses, such as pension expenses, that they may be unable or unwilling to fund with retained earnings. This is particularly so when their competition drives down the price that can be charged for goods and services while their own pension expenses drive up costs. Under these circumstances, profits from current operations may be needed for upgrading capital equipment, sales and marketing, or expanding operations and thus be unavailable for other obligations. As another example, governments may have to raise money to cover liabilities but be reluctant or unable to raise taxes. Still another example, charities may find that the cost to generate donations significantly limits the net amount actually raised, and, accordingly, may be looking for a more efficient way to raise revenue.

One way for non-profit and charitable organizations in particular to generate revenues is by persuading a donor to name the organization as a beneficiary of a life insurance policy on the donor's life. When the donor dies, the proceeds of the policy are paid to the organization. In this relationship, the owner of the policy is insuring his or her own life but naming the organization as a beneficiary. The organization must of course await the death of the insured before it receives any proceeds.

Life insurance may be used by for-profit organizations as well. However, in this case, the owner of the policy is not the same one whose life is being insured. Rather, the owner of the policy is the organization and the insured is likely to be a key employee and the organization is seeking to protect its interest in the employee's value to the organization. For an organization to initiate a life insurance policy on an individual, it must have an insurable interest in the life of the insured individual. The cost of the policy is borne by the organization, and can be a significant additional expense for the organization, particularly if there are numerous key employees.

The concept of an insurable interest is essentially a legal one, one that characterizes the nature of the relationship between two individuals or an individual and an organization and is defined by statute and case law. The person or entity initiating a policy must have an interest in the life of the insured individual in order to be permitted at law to obtain insurance on the value of that individual's life for financial protection in the event of the insured's death. The concept of an insurable interest depends on the laws of the applicable jurisdiction. For present purposes, an insurable interest will simply be defined as a legal relationship between an organization and an individual the existence of which relationship allows the organization to purchase a life insurance policy on the individual's life. When no insurable interest exists, the present system and method may be prohibited by law.

Recently, there have been a number of attempts to provide funding for an organization by purchasing a group of insurance policies, each one insuring the life of a different individual in whom the organization has an insurable interest, and to fund the cost of the insurance, in whole or in part, with a combination of cash value and death benefits. In some cases, the premiums are financed. However, a review of these programs suggests that they may be risky to the organization and are not as reliable, effective or flexible as the present invention, let alone structured to meet a particular organization's cash flow needs. Moreover, with so-called investor-owned life insurance (IOLI), stranger-originated (STOLI) or stranger-initiated life insurance, policies are created for the purpose of resale. The ownership of the policies and the rights associated with ownership of the policies are generally transferred by the organization that has the insurable interest to third parties, and are now disfavored. They typically violate the spirit and intent of insurable interest laws in order to reallocate proceeds or excess benefits not required to satisfy debt, to outside third-parties rather than to the organization that initially had insurable interest.

Thus an organization appears to have only three practical options when it comes to finding a source of revenue from life insurance policies. It can purchase life insurance on individuals provided that it has an insurable interest on those individuals; it can persuade an owner of a life insurance policy to designate it as a beneficiary; or it can persuade its donors or members to donate current life insurance policies they no longer need. The first option may be cost prohibitive; the second requires the organization to wait for its donor to die, in spite of the fact that its needs for cash may be more immediate and on-going, and the third may also be cost prohibitive, since it usually requires the organization to take over paying the annual premiums. Thus, there remains a need for finding alternative ways of financially protecting and funding organizations.

SUMMARY OF THE INVENTION

According to its major aspects and briefly recited, the present invention is a system and method for simultaneously allowing life insurance policies to fund themselves while generating residual cash flow for an organization which has an insurable interest in the insureds' lives. The present system and method need not use or jeopardize current assets of the organization or insureds, and does not require a net investment by the organization or insureds. Cash flows derived from the death benefits of life insurance policies can be sufficient in amount and timing to completely finance the purchase of the policies and, in many circumstances, to also generate a guaranteed cash flow to the organization while the debt for financing the premiums is still being retired. This result is achievable, and a program is implemented, provided that the cost of the program, as defined herein, is lower than or equal to the internal rate of return of the group of policies.

An IRR (internal rate of return) is the constant discount rate at which the present value of future cash flows equals the investment outlay. (The realized rate of return, on the other hand, depends upon the amount of premium paid, the benefit amount received, and the timing of both payments.) In the present invention, the IRR is defined in a somewhat different manner. Specifically, in the present invention, a program is defined to run a period of years, such as twenty or forty years. During that program, many but not necessarily all of the individuals in the group of insured individuals will be predicted to die based on applicable mortality tables. An IRR would normally be determined when the last member of the group of insured individuals dies. In the present application, on the other hand, the IRR is not the IRR when the last participant is expected to die, but the expected IRR of the cumulative matured policies up to the time of the retirement of the debt for paying the premiums. Unless otherwise stated herein, IRR has this meaning.

The rate required for repaying the debt, including interest, servicing and all other costs associated with borrowing, will be referred to herein as the "borrowing rate" or "cost of borrowing." Once the IRR exceeds the borrowing rate, the user will know that the debt to purchase the policies (plus other initial costs, if any) can be repaid and cash flows can be provided to the organization. The spread between the IRR and the borrowing rate will determine the achievable size and timing of cash flows to the purchasing organization, both during and after the debt period. The greater the spread between the two, the faster the debt can be retired and/or the greater the revenue to the organization, given a particular population of the group selected.

The term "cost of the program" will be used herein to indicate a rate rather than a dollar amount. The cost of the program is the discount rate for the debt structure that is established to finance the premiums on the group of policies, which may include service costs, LIBOR spread, credit spread and also the cash flow to the organization until the debt is retired.

If the IRR is not greater than or equal to the cost of the program, the variables used to calculate these two parameters can be adjusted, such as, for example, by being more restrictive in the selection of those participating in the group or by finding policies with lower premiums or by limiting the cash flow to the organization prior to retirement of the debt. Iterative adjustment of these and other variables that affect IRR or the cost of the program, or both, may result in an IRR that exceeds or equals the cost of the program.

Moreover, an initially large spread between the IRR and the cost of borrowing allows the organization flexibility in meeting its particular revenue goals. The spread can be used to obtain or increase an initial payment or to obtain or increase annual payments, or to pay off the debt more quickly. Importantly, it can be used to add more people to the group of insured individuals, even people who may lower the IRR and delay retirement of the debt but who will also add to the organization's revenues through added death benefits. As long as the IRR equals or exceeds the cost of the program, the cash flow will be positive but the size of the gap between them is but one factor in determining the amount of revenue the organization can receive. Other factors include the number of people in the group and the face value of the policies.

Simply stated, a major feature of the present invention is that the interaction between the Internal Rate of Return, the cost of borrowing, and the cost of the program determines if a program is viable, if the organizations goals can be met and which funding options are available.

A major feature of the present invention is that it can be structured to require no financial resources from the organization or from the insureds. The financing for most nonprofits and some other organizations comes from third parties entirely. (Some organizations such as non-profit corporations, for-profit corporations and government entities, however, may elect to self-finance or partially self-finance, or fill the role of the liquidity facility of the present system and method, if their alternative investment opportunities so dictate, or even employ some form of annuities to pay for the policies or guarantee payments to either the lenders, organization, or both.) Moreover, given the appropriate debt structure and the optimal mix of insured individuals, not only can the present system and method generate revenue from insurance proceeds after the debt is paid off but also at the debt's inception and during the debt payoff period, if desired. Some organizations may choose to only receive funding after the debt is completely retired, such as setting up an endowment program.

Another important feature of the present invention is that it does not require the policies or rights thereof to be transferred or assigned to the entity financing the cost of the premiums. Rather, a unique feature of this system and method is that the policies are initially and will remain owned by a "special purpose entity" (SPE) which is also the beneficiary. The SPE is established by and, in most cases, will be a wholly-owned subsidiary of the organization and is deemed to have the same insurable interest. The SPE is governed by terms set forth in legal documents. Only the future cash flows derived from the death benefits of the policies are assigned as collateral to the financing entity and only during the debt period. Other insurance-based funding system and methods require transfer of ownership of the policies (or at least the ability to transfer ownership and other rights and privileges by assigning the policies as collateral) or use a trust, which may issue certificates of ownership, for example, to ultimately accomplish the equivalent of a transfer of rights and privileges from the initial owner and/or beneficiary. Many require the use of cash build-up within the policies to support the loan structure, and in most cases, to provide benefits to the organization.

A unique feature of this system and method is that it does not require any type of transfer, whether direct or indirect, to a party financing the debt or to a trustee. As a result, the initial insurable interest relationship that is required to initiate the life insurance policies can remain in tact until all policies have matured. The debt structure itself can provide further safeguards against violating insurable interest laws by actually prohibiting the transfer of ownership rights, and prevents the revocation of the SPE as beneficiary until debt is paid.

In a standard securitization process, as opposed to a loan or other conventional debt structure, an originator of financial assets (e.g., loans or receivables) selects a group of existing financial assets from its portfolio. The originator then sells this pool of financial assets (cash flows) to a special purpose entity (SPE) established exclusively for the asset-backed securities (ABS) transaction. In turn, the SPE typically issues the asset-backed securities to investors. The goal of this securitization process is to isolate the assets to insure that payments to investors depend exclusively from the pool of assets and credit enhancements rather than from the originator's promise to pay. To accomplish this with a conventional securitization, the sale of the assets to the SPE must be a "true sale" in legal terms. When a true sale occurs, the financial assets are transferred to the SPE without recourse, and investors in the ABS have the right to the cash flows on the pool of assets, even in the event of the originator's bankruptcy. The true sale of assets distinguishes conventional asset-backed securities from other types of bonds, which are typically the obligation of the originator. Also, the financial structure of the current system and method should not be confused with a "monetization". In a conventional monetization of assets/receivables, the assets are preexisting, they are still connected to the obligations of the company, and there may be "no true sale" accomplished or required, such as in a pure securitization. However, a distinction between the current system and method and other forms of conventional monetization is that in the present system and method, the receivables do not exist prior to the securitization, and the assets (insurance policies) producing the cash flows/receivables are not connected to any other form of obligation of the company/organization. The present invention eliminates the need for a true sale of assets because the SPE is the originator and owner of the assets producing the cash flows (i.e., the life insurance policies) and remains owner and beneficiary throughout the term of ABS notes. Through the governing documents in the establishment of the SPE, the sale or transfer of ownership of and/or rights to the assets (life insurance policies) can be prohibited.

Another advantage of an SPE owning the policies and being the beneficiary, when the debt structure is based on asset-backed securitization, is that it creates bankruptcy remoteness and therefore protects the note holders in the event the organization goes out of business, and it protects the organization in the event of default on the notes. The SPE must at least be a separate legal entity that is established for the purpose of benefiting the organization and protecting the note holders.

Another unique feature of this invention's debt structure is that it can ensure that 100% of excess cash flows (net positive cash flows) go to the organization with whom the original insurable interest existed, because cash flows are used exclusively for repayment of debt, which includes all borrowing cost, and for funding the organization.

Another unique feature of the present invention is that the structure can establish the timing of and guarantee a fixed amount of funds to the organization during the debt period regardless of when deaths occur, and without using the cash values of the policies. In fact, even in the unlikely event that the insurance companies never paid, the organization would have received its guaranteed amounts, up through the point at which the program ended. Therefore, funding is guaranteed to be paid to the organization regardless of whether the death benefits of the life insurance are paid.

Still another feature of the present invention is that the present invention does not depend on a build-up of cash value of the policies, particularly when financed using debt structures such as asset-backed securities. The cash value if any is not required. The source of revenue required for retiring the debt is simply and solely from the cash flows arising from future death benefit proceeds of the maturing policies. In fact, if having no or low cash value in the policy type selected would reduce the premium, it would be preferred because a lower premium would improve the IRR and therefore increase the gap/spread. Although the use of cash value is not required in the current system and method, it may be advantageous if a policy with a better performing cash value, such as variable life, indexed life, or any other product were to be used in order to increase the death benefits. In other funding programs involving life insurance, the cash value of the policies is heavily depended upon for various aspects of those programs, such as providing cash flows to the organization, serving as collateral for the debt, repayment of the debt, and payment of life insurance premiums in the years when there are insufficient death benefits to do so, Another important feature of the present invention is the use, in a preferred embodiment, of asset-backed securitization as a debt structure for initiating life insurance policies by funding their premiums. Asset-backed security structures have been used to finance existing receivables. Furthermore, securities have been backed by existing life insurance policies (e.g., Life settlements). In addition, insurance companies have securitized the receipt of their future premiums on existing policies, which are liabilities to them. However, the present transaction, when using asset-backed securitization as a debt structure, is not known under circumstances where it is used to initiate/fund the policies, thereby creating the asset (yet-to-exist life insurance policies) that will produce cash flows to back the security. In the present invention, notes are issued in the ABS market, proceeds of which will pay the premiums, creating the life insurance policies from which the cash flows to back the security are derived. This is a significant feature of the present invention.

Another important feature of the present invention is that the program could be funded by a number of different debt structures. For example, the program could be financed with asset-backed commercial paper with either single-seller or multi-seller conduits. This asset backed commercial paper program could be fully or partially supported. Liquidity enhancement could be pool-specific or program-wide.

Another important feature of the present invention is that net positive cash flows are generated by this invention with no out-of-pocket risk or expense to organizations or insureds.

Another important feature of the present invention is that the net positive cash flows arising from this invention are substantial, virtually unlimited and can be used in a variety of ways for a variety of purposes such as funding corporate and bank owned life insurance policies, funding defined benefit plans, funding pension funds and other health and benefit plans, funding higher education and scholarship programs, funding private education, funding social security. The financial markets will have a new class of asset-backed securities, a new class of bonds, the ability to manufacture uncorrelated assets, and the ability to retire or replace traditional debt backed by correlated assets with debt backed by non-correlated assets. This invention can also be used to prevent the default of mortgages and securities backed by those mortgages. Insurance companies and insurers will realize greater, unprecedented sales levels. Donors and members of organizations will become philanthropist with no out-of-pocket expenses. Consumers will obtain insurance at a lower cost. The government receives tax revenue without increasing taxes, and benefits from the reduced burden of funding and backing various programs such as retirement plans and various other social programs that could be provided by charitable organizations, instead. The cost of life insurance policies can be reduced through premium financing and since the original insurable interest remains intact the invention remains well within the spirit and intent of insurable interest laws through out the country, allowing the invention to operate in the real world. Across the board, there is a significant and almost unlimited appetite for implemented programs.

These and other features and their advantages will be apparent to those skilled in the art of structured finance and funding organizations from a careful reading of the Detailed Description of Preferred Embodiments accompanied by the following drawings.

BRIEF DESCRIPTION OF THE SEVERAL VIEWS OF THE DRAWINGS

In the drawings,

FIGS. 5A and 5B is a two-part chart showing the breakdown of the final pool of participants of FIG. 4 after underwriting by age, gender and health, with the top half of the chart shown in FIG. 5A and the bottom half of the chart shown in FIG. 5B;

FIG. 6 is a table showing an illustration of the projected cash flow resulting from a hypothetical group of 1000 58-year-old male non-smokers with standard health and the per policy internal rate of return in the year the policy matures;

FIG. 8 is a chart showing examples of policy costs for different ages and classifications of insured individuals and the internal rates of return of a group of 1,000 such policies;

FIG. 9a is a graph showing the debt balance as a function of year following implementation of a program according to the present system and method for a hypothetical internal rate of return of a group of policies and a somewhat smaller borrowing rate for a program developed according to a preferred embodiment of the present invention;

FIG. 9b is a graph showing the borrowing rate (constant) and the corresponding running internal rate of return of the group of policies as a function of program implementation year for a hypothetical group, according to a preferred embodiment of the present invention;

FIG. 10 is a chart showing total revenues to a charity from various scenarios in which the debt structure and policy premiums are varied, according to a preferred embodiment of the present invention;

FIG. 11 is a chart showing internal rate of return for each age category of a group of 1,000 such policies as a function of the program duration, according to a preferred embodiment of the present invention.

DETAILED DESCRIPTION OF THE INVENTION

Figure 1:
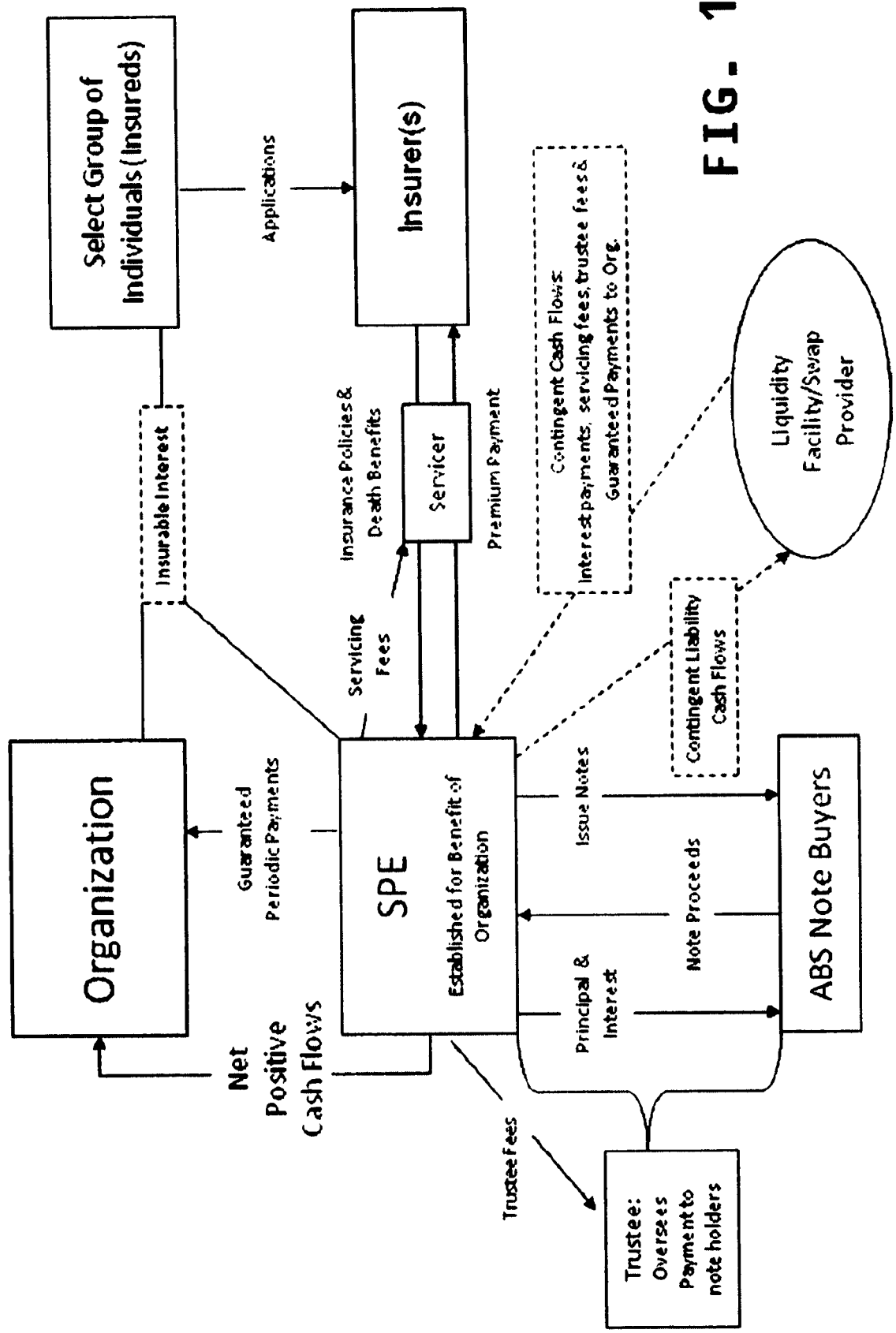
FIG. 1 is an example schematic of the present system and method illustrating the components of the present invention, their interaction, and the flow of funds within the system and method.

The present system and method utilizes a suitably programmed computer along with a financial model and various other elements and components to fund organizations. The computer is used to process large amounts of data, and performs calculations within the financial model, based upon the timing and amount of cash flows into and out of the financial model. The computer-generated results determine the funding program's viability. The input data can be further manipulated for the purpose of improving the result and thus optimizing the program to enhance funding to the organization, or customize it to the specific needs of the organization. The system and method is automated, and if the variables are not changed, the results are concrete, exactly the same every time the computer calculations are performed.

There are three phases to the system and method for funding organizations: (1) the designing phase, as taught in paragraphs [0046] through [0112]; (2) the building phase as taught in paragraphs [0113] through [0114]; and (3) the implementation phase, as taught in paragraphs [0115] through [0119]. The design phase involves using the organization's census data to design, analyze, and optimize the funding of the organization. The building phase begins once the design phase is complete, and involves constructing the funding structure with binding documents, and establishing the appropriate entities and relationships necessary for implementation of the system and method. Finally, the implementation phase of the system and method begins once the structure is in place, and the SPE receives the proceeds from the issuance of the debt used to finance the purchase of the life insurance policies.

The design phase of the system and method involves the analysis of two main sets of data: (1) projected cash flows into and, (2) projected cash flows out of the financial model. Projected cash flows into the model are derived from calculated death benefit payments based upon a select group of insured individuals. Projected cash flows out of the model are derived from calculated insurance premiums, also based on this same group of individual insureds; all of the costs associated with financing the purchase of life insurance policies on the lives of this same group of individuals through an asset-backed security debt structure; and the funding requirements of the particular organization.

The future death benefit proceeds from the life insurance policies serve as the sole collateral for the asset-backed securitization, and not the policies or their cash values. The proceeds from the securitization are sufficient in amount to: (1) initiate the same policies providing those future death benefit proceeds by paying the initial, and any necessary ongoing premiums; (2) pay for all debt underwriting costs; and (3) provide an initial and ongoing funding for an organization. The initial premiums, and any future premiums, are calculated from the premium costs required to insure a selected group of individuals in which the organization has an insurable interest. Once the life insurance policies on the lives of the selected group are issued by the insurer, the selected group of individuals becomes the insureds. In the preferred embodiment of the current invention, death benefits are payable to the designated beneficiary which is the SPE. The ongoing costs of the program include an annual funding amount to the organization, if desired; servicing costs including trustee fees; repayment of debt, including principal and interest; and other miscellaneous costs inherent with an ABS debt structure, or other applicable debt structure used to finance the purchase of the policies, such as zero coupon bonds, asset-backed commercial paper, etc. The structure may also utilize a swap provider or other type of liquidity facility. The timing and amount of the incoming death benefit cash flows and annual premiums, if any, are initially predicted using applicable mortality tables, along with Monte Carlo simulations, or other types of predictive simulations, on the same group of insureds at a given face amount per policy.

Through various iterations and simulations, the fully automated system and method utilizes the computer and financial model, in conjunction with the manipulation of various census data, annual funding amounts to the organization, etc., to optimize the predicted cash flows of the current system and method for funding an organization by completely financing, through an asset-backed security debt structure, or other suitable debt structure, insurance policies on a group of individuals, in which that organization has an insurable interest, without the need for transfer or subsequent sale of those same policies, and while using only the death benefit cash flows as collateral for the debt. This optimization process produces an output or result. Essentially the computer processor calculates the amount and timing of all incoming and outgoing cash flows. The incoming cash flows are used to pay down the debt from financing while simultaneously funding the organization. The output shows the guaranteed annual amounts to the organization, the overall benefits to the organization, the length of the debt period, interest paid in each period, swap payments if any were needed, and all other detailed financial information generated by the computer that constitute an ABS debt structure. This optimization process produces an output or result. If the organization's main goal is to increase its guaranteed amount of funding, the annual amount is increased, along with other changes in data, such as the selected mix of insureds, mode of premium payment, etc. Various data can be selected for each iteration, either manually, or through reoccurring loops that solve for the desired results, and then manipulated to achieve optimal results. With each iteration, the automated system and method is activated, and will yield a result, which may be different than that of the other iterations, but it too is repeatable, yielding the same result each time that specific scenario is run. This output predicts whether or not the organization can be funded, and in what amount, annual and overall.

Referring now to FIG. 1, there is illustrated an example of a flow diagram of the present invention, in its most preferred embodiment, showing the relationships between the organization, the special purpose entity (SPE) which is established by the organization for the benefit of the organization and is governed by the terms of legal documents, the organization's members and the insurance companies providing the insurance on the lives of the members who apply for coverage, as well as those that are involved in the debt structure using asset-backed securitization. The organization and the SPE it sets up for generating funding for the organization both have an insurable interest in the lives of the organization's members and donors. The SPE will pay guaranteed payments, such as annual payments, and excess cash flows after its debts are retired, to the organization. It will purchase the insurance policies on the group of members and will receive death benefits from the insurance company when any policy on one of its members or donors matures. The SPE also issues notes to the ABS note buyers in return for payments of principal as the policies mature and interest on the notes according to the market-determined yield curve in effect when the notes are issued, perhaps using a trustee to facilitate and oversee those payments. The repayment of the notes with interest thereon, and all costs associated with the notes is determined to be the "borrowing cost" of the notes. The repayment of notes and borrowing cost become one of the financial obligations of the SPE. If a trustee is used, the SPE also pays the trustee fees. The SPE pays the servicing fees to the Servicer. The Servicer monitors the pool of insurance contracts, and ensures that the contractual performance of the parties to the pool (insurance company) is performed satisfactorily, and administers cash flow of death benefits to the SPE. The SPE may provide for contingent cash flows for interest payments, servicing fees, and the guaranteed payments to the organization using a liquidity facility or swap provider to smooth out what might otherwise be a "lumpy" cash flow (lumpy being defined as not constant, uneven in amount and timing) caused by a lag from time to time between actual mortality and expected mortality so that the schedule of payments of interest to the ABS note holders can be met. Importantly, the SPE, as governed by the terms of its enabling documents and contracts directs a portion of the note proceeds from the issuance of asset-backed security notes to one or more insurers to fund the initiation of life insurance policies on a selected group of individuals by paying the life insurance premiums. The insurer issues the life insurance policies to the SPE. Once the life insurance policies have issued, the selected group of individuals become the insureds. Essentially, the note proceeds are used to purchase the policies that will generate the cash flows that are securing the notes. These events happen substantially simultaneously, that is, in the same transaction (or mutually contingent transactions).

Importantly, the SPE has the same insurable interest as the organization. Same insurable interest means that the SPE may legally purchase life insurance on a selected group of individuals and that the organization could purchase life insurance on that identical group of individual because the latter has an insurable interest in the lives of the individuals of that group. Without the organization, the SPE would not have an insurable interest in the group. Without the SPE the organization would still have the insurable interest. Therefore, the SPE only has insurable interest in a selected group of individuals because of its relationship with the organization. In essence, the organization shares its insurable interest with the SPE. There may otherwise be differences in the insurable interest the SPE has compared to that of the organization, or not, under prevailing law. Finally, and also importantly, the SPE does not receive title to the policies or the beneficial rights in the policies via transfer. Transfer is not necessary, due to the fact that the SPE is the originator of the policies. Indeed, the debt structure can forbid transfer of title by the SPE and the revoking of the beneficial interest in the SPE.

The sole source of revenue of the SPE will be seen to be the death benefits, not cash value, and from that source, all costs of the program are paid with all the remainder going to the organization, which total of the remainder is forecasted and guaranteed amounts are known and fixed when the program is established according to the present invention and uses the ABS debt structure.

In some cases, the organization may be unable to obtain a positive outcome using the present system and method. The organization may not have a pool of insurable individuals who together constitute a group of insurance policies that have an IRR higher than the borrowing rate. Other organizations, such as large charitable organizations or other large non-profit organizations such as universities, pension funds, etc., will very likely be able to generate considerable sums of revenue using the present system and method simply because they can select, from among their donors, a large pool of insurable individuals for policies with the highest predicted IRR ranges, and the fixed cost of the annual payments to the organization are spread over a larger number of policies.

The present invention utilizes a computer-implemented interactive mathematical model to compute the expected IRR/borrowing rate gap and to help the user optimize a funding program for an organization. Any organization may use the present system and method provided that it has a sufficiently large pool of insurable individuals, preferably 1,000 or more, in whom it has an insurable interest. The organization may be a non-profit organization with memberships or donors, a for-profit corporation that may want to fund a retirement program or a government that may also have unfunded benefit liabilities.

The present invention is based on purchasing a group of life insurance policies. The primary requirements of these policies are that (1) their premiums must be relatively low and (2) they insure through a desired age. If the policy has cash value that builds up, the cash value may be irrelevant to the program because it is the death benefit that is the only source of revenue required to retire the debt and not the cash value. Therefore, the choice of the policy is determined, first, by whether or not it insures each insured participant through a desired age and, second, does it have a relatively low premium. A useful policy for the present invention is a so-called blended universal policy, which has a larger term component and smaller universal life insurance component. Thus, although it does have a small cash value, its premium is relatively low and it can be structured to insure the insured individual for the life of that individual. Other types of policies may appear or be developed that better meet the two requirements set forth here.

Another consideration in the choice of the policy is its mode of payment. A single premium policy is purchased for a single, initial, lump-sum premium. While this type of policy is not essential to the present invention, financing the premiums of a group of policies is simplified if all policies in the group are single premium. Then a single sum is financed in one transaction, and all the uncertainties and contingencies regarding multiple premium payments over time, such as the possibility of default, can be avoided. However, other payment modes may have certain advantages that outweigh the need for simplicity, such as shortening the average life of the debt instruments, traunching the debt for each of the multi-pay premiums, etc. Although all of the payment modes have advantages and disadvantages, the current system and method can be customized to utilize each.

In exchange for premiums, one or more insurers issue life insurance policies on the lives of a selected group of individuals to the SPE established for the benefit the organization. Life insurance policies have a beneficiary and death benefits. The SPE, acting on behalf of the organization, is designated as the owner and beneficiary of the policies. An SPE is a separate legal entity that is established for the purposes of benefiting the organization. Only the future cash flows derived from death benefits will be provided to the financing entity as collateral for the debt; no other assets of the organization or SPE are required and no other payments need to be made by the organization.

Figure 2:
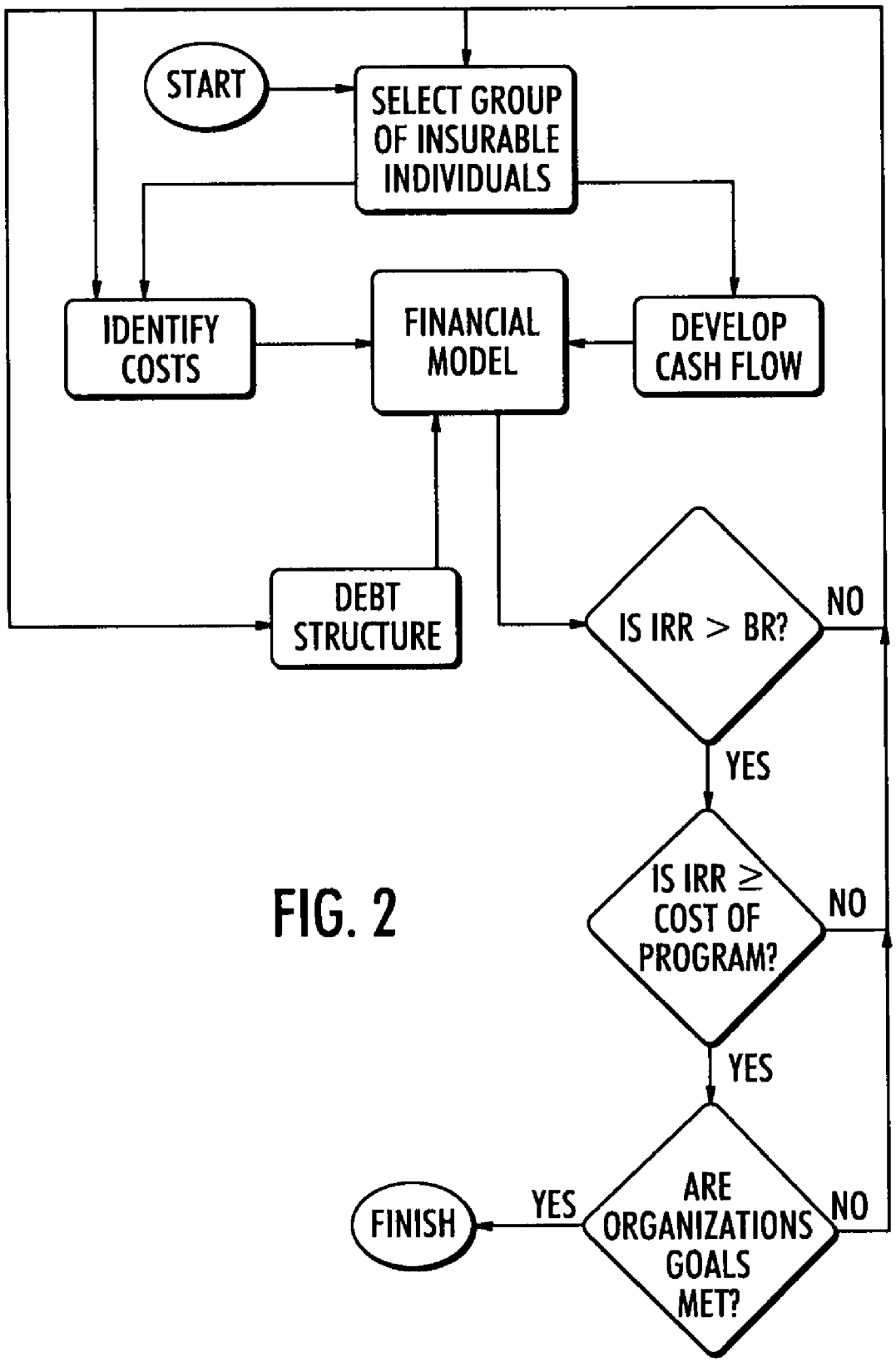
FIG. 2 is a flow chart illustrating an example of a system and method for funding an organization, according to a preferred embodiment of the present invention.

FIG. 2 provides a general overview of an example utilizing the present system and method. The flow chart shown in FIG. 2 illustrates how the program operates to achieve the organization's goals. The selected mix of individuals, which constitutes the group, is the main factor that determines the timing of cash flows into the model. The selected mix of individuals is responsible for the majority of the cost of the program through the insurance premiums. The timing and amount of the cash flows and the borrowing rate associated with the debt structure are both driven by the life expectancy of individuals in the group and the amount of insurance on each. Therefore, a change in the selected mix of individuals which constitutes a group directly affects all aspects of the present system and method. Within limits based on the membership of the organization, the mix can be adjusted to change and/or improve the outcome of the program.

Cost information, cash flow information and debt structure information are combined mathematically in a financial model to determine the internal rate of return of the policy group and compare it to the borrowing rate and to the cost of the program. If the IRR is greater than the borrowing rate, the select group of insurable individuals, policies and borrowing rate constitutes a set of variables that can at least repay the debt. If the IRR equals or exceeds the cost of the program, the organization is assured of at least some funding. By iteratively adjusting the variables, such as the premium cost and the group mix, the resulting funding to meet the goals of the organization can be optimized.

Figure 3:
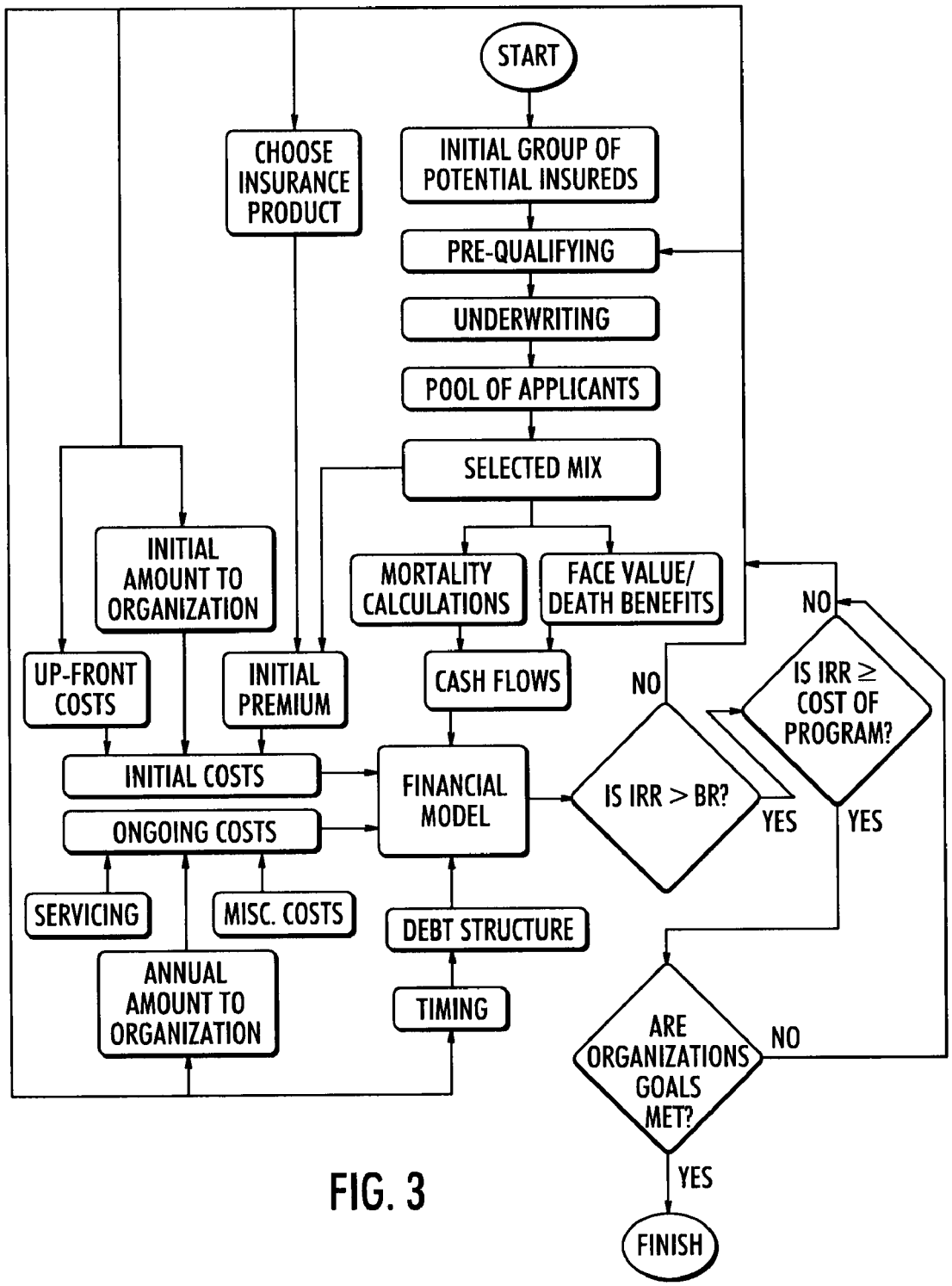
FIG. 3 is the flow chart of FIG. 2 illustrating the present system and method in more detail, according to a preferred embodiment of the present invention.

Referring now to FIG. 3, which shows the use of the present system and method in more detail. The use of the present invention thus begins with the selection of a group of individuals with whom the organization has an insurable interest. This is the first step toward indentifying a group of policies that will product the cash flow. In a guaranteed issue scenario, a policy can be issued on every member of the initial group regardless of health status, gender, age, etc. So, it is possible that the final group may be the same as the initial group. However, based upon the organization's goals, even if all applicants qualify for participation, it may be advantageous to exclude a portion of the pool in anticipation that the internal rate of return will need to be improved for the program to generate a positive cash flow. Indeed, there are criteria for the selection of the optimal composition of individuals to achieve a desired result. The composition used may vary depending upon the individuals available from which to draw and the organization's goals. If the applicants from the group are to be underwritten, the first step is to pre-qualify the initial pool of applicants to find a more suitable and realistic group of likely insurable applicants.

Ideally the final group is large, having at least one thousand individuals, and having a distribution of ages, but preferably having a majority of them in the age group from 40s to 70s. In the example to be described, the insurance policies are fully underwritten and it is important in this case that all the individuals that are finally selected be insurable and be qualified at least as standard risks from a health standpoint. Standard risk is a term used by insurance companies to characterize those who have acceptable if not exceptional health. Insurance companies generally characterize those with satisfactory health as standard, and those in better or exceptional health as preferred and preferred plus. In some cases, the organization can use life policies characterized in the insurance industry as simplified issue or guaranteed issue so that there will be fewer or no restrictions on participation due to health.

A suitable pool then may contain a minimum of 1000 individuals, all participating, all insurable, all willing participants, and most between the ages of 40 to 75. While adjustments may be made to such a pool of individuals, a pool with these characteristics would be a suitable starting group. If the group is smaller than 1000 individuals, the cost of borrowing will likely increase because of the greater uncertainty as to the actual mortality it will experience. A larger group will have less uncertainty, meaning that it will likely have a mortality experience that more closely tracks mortality predictions that apply to that type of group. A group with an age distribution skewed toward younger members will likely have a slower cash flow experience and lower IRR during the debt period. A group with an age distribution skewed toward older members will likely have a faster cash flow experience and may have a higher IRR during the debt period unless the number of elderly members is disproportionately higher, in which case the premium cost will likely be higher, and perhaps prohibitive.

The pool of individuals should be insured with policies of reasonable face values, based on the value of the individuals to the organization. In the present example, policy face amounts such as $250,000 or $500,000 are suitable starting points. If the organization is a university with both larger donors and smaller ones, it may use policies with different face amounts for the individuals in the two groups. Combining the information about the individuals in the group, the policy face value information and the appropriate mortality information, the present model yields a prediction of the distribution of cash flow by year.

The information about the final group of insurable individuals is used together with appropriate mortality tables, in accordance with the present system and method, and which tentatively identifies the group of insurance policies, to generate the timing and amount of cash flows into the program. Mortality tables will identify the likelihood that some individuals of each age may die in each year beginning with the first year of the program and continuing until each member of the group is predicted to die. The death of each member triggers payment of a death benefit from the corresponding life insurance policy. The death benefit payment of each policy contributes incrementally to the cash flow.

On the other side of the equation, there are costs to be identified. There are initial and on-going costs. The initial costs include the cost of purchasing the policies, debt underwriting fees and initial payments, if any, to the organization. The on-going costs include interest on the debt and periodic payments to the organization, if any. A source of financing is selected that will most likely finance the cost of the program from the death benefits of the policies. The debt structure used for financing will have a cost of borrowing (which may include credit spread, LIBOR spread, servicing cost) indicated by a rate.

The interaction of the debt structure, cash flow from the policy death benefits and initial and ongoing costs is difficult to predict without running a calculation using the present financial model, implemented using a suitably programmed computer, to determine whether the given set of inputs will result in a viable program; i.e., one that results in positive cash flow to the organization while retiring the debt in a finite amount of time. The outcome of this first calculation gives the user an initial idea as to whether the program is viable and, if so, the degree to which it is viable. Viability is achieved when the IRR exceeds the borrowing rate. By adjusting the inputs, the outcome may be improved. When the IRR equals or exceeds the cost of the program, the initial objectives of the organization are met: it can receive net proceeds. The gap between the IRR and the cost of the program may be further increased by adjusting variables such as the pool of participants, the debt structure, and the policy premiums. Once the gap is as large as it can be, the user can begin to make it smaller by increasing the number of participants and/or the payments to the organization until the gap between IRR, with the additional participants, and the cost of the program, now revised, is near zero but still at or above zero. The process of optimization is an interactive loop which can produce a final outcome that is close to meeting or even exceeding the organizations goals.

The borrowing rate and debt structure is of great importance. Any source of financing that provides low rates, such as, to give one example, the asset-backed securities market, should be considered. Additionally, devices such as surety wraps can be used to protect against those circumstances in which actual mortality experience lags predicted experience. Swaps may be used to smooth lumpy, uneven cash flows derived from the uncertain timing of cash flows arising from death benefits which are paid by the insurer to the beneficiary (SPE), and/or to provide for fixed and guaranteed cash flows to the organization during the debt period.

In the present example, however, in order to maximize benefits to the nonprofit organization (i.e., borrowing at the lowest available rates), the default debt structure is assumed to be based on notes sold in the asset-backed securities (ABS) market. Simply put, ABS buyers lend funds at very competitive rates because they are backed by specific pools of assets. Usually the securities will make floating interest payments semiannually with a coupon formula based on the six-month LIBOR rate plus a predetermined credit spread. The principal and interest in this case are paid from proceeds of death benefits received as the individual policies mature. The asset-backed security structure is further characterized by payments of principal following payment of death benefits.

Another important feature of the present invention is that the lender (e.g., ABS note-holders) is indifferent to the pool's realized mortality rate over the program's life. The debt structure has a defined schedule of market-determined interest rates, based on an applicable yield curve and has a guaranteed schedule of payments. From the lender's perspective, the pay down of the debt's principal is uncorrelated with macroeconomic variables like interest rate. In contrast, other insurance-based funding programs benefit from an accelerated mortality rate. For example, an investor in an STOLI program retains an equity stake in the life insurance pool (like an owner of common stock) in that the return on the investment depends directly on the pool's realized mortality rate. Graphically put, if the pool's mortality rate is faster than expected, an STOLI investor benefits from the faster payoff of the death benefits. In sharp contrast, lenders in the present program do not have an equity claim and are therefore not owners. Like all lenders, their primary concern is the return of the amount lent and interest. The interest payments they receive are fixed by contract and, regardless of the pool's realized mortality rate, cannot exceed the contract amount. In addition, there is also prepayment risk to the ABS note-holders, in the event of higher than expected mortality.

Another important feature pertains to the organization itself, since the payments (i.e., upfront lump sum and annual periodic payments) are guaranteed to the organization using the present invention; they are likewise indifferent to the pool's realized mortality rate during the debt period. Since payments to the organization are fixed in the present program, the organization is actually better off while the insured individuals are alive since the organization is also benefiting from their ongoing contributions. Thus the present invention eliminates the specter that haunts schemes for funding organizations using insurance that the lender or the organization is "gambling on death."

It is also important to note that the pay down of the principal is uncorrelated with a change in market interest rates because there is no causal linkage between interest rates and mortality rates. This is an appealing feature for investors compared to typical ABS securities, which pay back principal faster when rates are lower, which in turn forces ABS investors to reinvest at lower interest rates. When ABS securities are backed by the guaranteed cash flows derived from the death benefits of a pool of life insurance policies, they do not possess this unappealing property therefore, this invention creates a marketable, tradable uncorrelated security.

On the close of the transaction in which the identified group of policies is purchased, the organization will enter into a single currency interest rate and liquidity swap to provide liquidity for servicing the interest due on the ABS notes, for servicing and trustee fees and the annual payments to the organization, if desired, and for hedging the underlying interest rate risk associated with floating rate notes. At closing, the timing and amount of funding to the organization will be determined, and the swap provider may make the initial payment, if any, to the organization. The life insurance policies and securities will become effective substantially simultaneously.

The information regarding the cash flow distribution by year based on the selected pool of individuals, the debt structure and borrowing rate, and the costs of the program are combined in a straight-forward mathematical way to project cash flows and thereby predict if and when the received death benefits can retire the debt and produce a net positive cash flow to the organization. This will occur if the internal rate of return of the group of policies is greater than or equal to the cost of the program during the term of the debt. The larger the initial difference between the IRR and the cost of the program, the sooner the policy debt can be paid off and the larger the overall benefits may be to the organization.

The IRR of a single policy is the constant discount rate that makes a future cash receipt equal to the investment outlay. In calculating IRR for a group of policies, the initial outlay, namely, the single lump sum premium for the group of policies (in the example used), is equal to the sum of the discounted future cash in each year (or other period of time). The future cash in year j is equal to the face value of all of the policies predicted to mature in year j discounted to the present. The equation for determining IRR is as follows:

$$0 = C_0 + C_1/(1+R) + C_2/(1+R)^2 + C_3/(1+R)^3 + \ldots C_n/(1+R)^n \text{ where}$$

$C_O$ is the initial outlay (a negative number), $C_1$ through $C_N$ are the policy proceeds (positive numbers), n is number of the interval (year) when the debt is retired and R is the internal rate of return (IRR).

In the equation for IRR of the group of policies during the desired term of the debt, the initial outlay is known; the cash flow for each year of the future is predicted from the applicable mortality tables given the underwriting information about the final group of insurable individuals. Therefore, the only variable not known is IRR, which can not be solved for analytically, but the IRR can be calculated numerically.

Based on an initial calculation of IRR and knowing the cost of borrowing from the tentatively selected debt structure, the organization will know whether it can use the present system and method for funding itself or, alternatively, that that prospect may be in doubt. In either case, however, subsequent iterations may be done using different values for the input variables to improve the results. Many of the variables that affect the outcome can be adjusted in such a way as to improve the outlook for funding that meets the organization's needs. The user of the present computer-based and interactive model may iteratively adjust the values of the variables to locally optimize the program.

There is no universally optimal result, however, since some organizations need larger initial cash infusions or larger year-to-year infusions and each organization will have a different pool of those with whom it has an insurable interest from which to choose. Given an organization's needs for funding, and in particular its needs for near-term and annual funding, and its flexibility in tailoring its group of insured individuals, it will be possible to improve the initial outcome, perhaps significantly, by repeated iterations of the basic calculation. Through various iterations, the funding needs of an organization can be optimized for a given organization.

As stated above, the process begins with the selection of a group of individuals from among those with whom the organization has an insurable interest. This group of potentially insured individuals is first pre-qualified to limit it to those who are willing to participate and to those who are more likely to pass underwriting. Those that are candidates after pre-qualification are subject to underwriting approval to generate the final group of insurable individuals.

Figure 4:
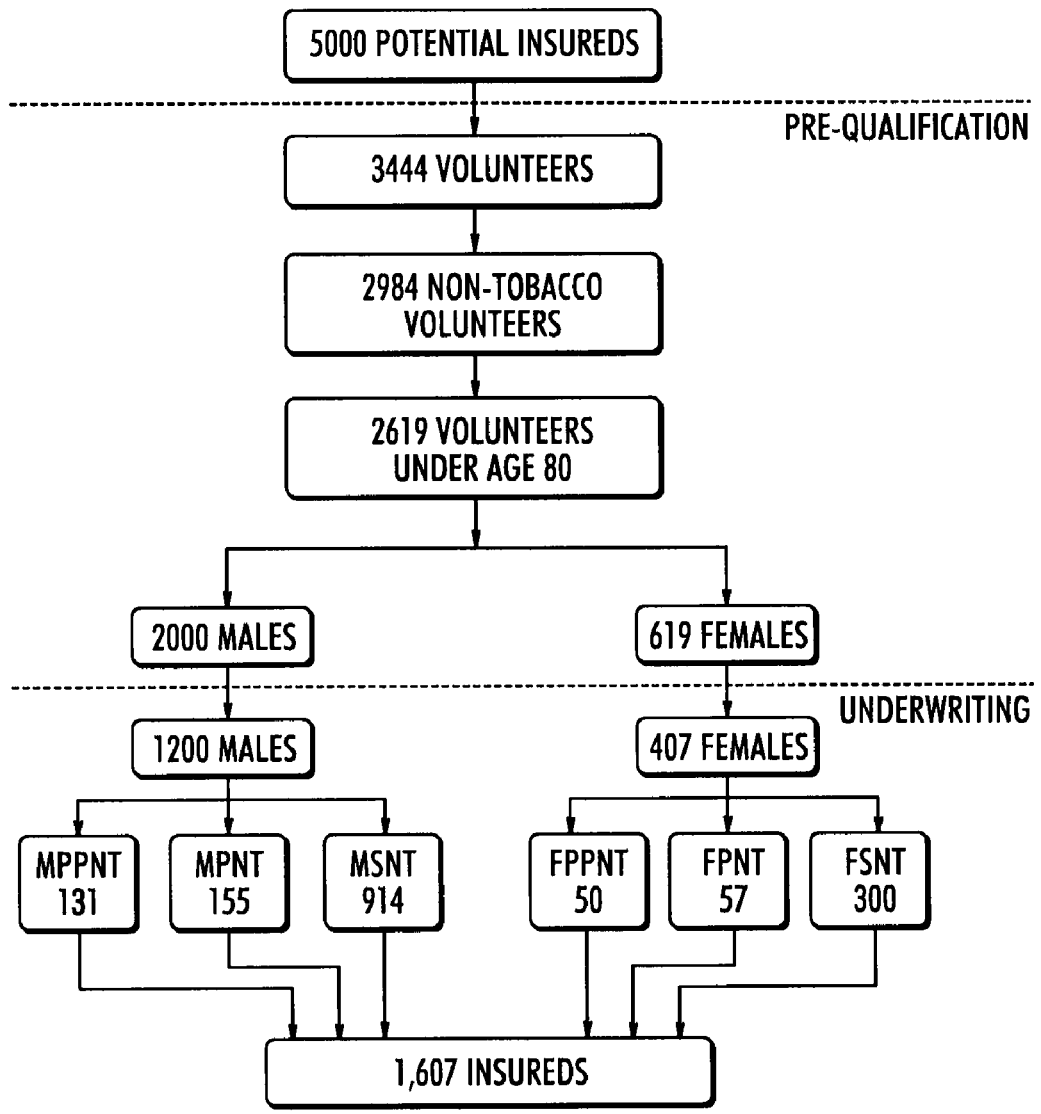
FIG. 4 illustrates the development of a pool of participants, according to a preferred embodiment of the present invention

FIG. 4 illustrates a hypothetical example of this pre-qualification step. The illustration shows the reduction of an initially larger group to a smaller pool of candidates. For simplicity in the example, a charitable organization has the stated goal of maximizing the cash flow to the organization both on an annual basis while the debt is outstanding and on a cumulative basis after all policies have matured. The charity's intent can be met by the use of life insurance on its members to protect the organization from the loss of this important asset. Policies may typically have a face value of $250,000 and $500,000.

If a sufficient number of volunteers are available within an appropriate age range, the organization will find itself to be a suitable candidate for the present program. A basic group census is used for initial projections. If the group is very large, a subset of the group may be used provided that the subset has sufficient number of willing, insurable participants and the age range includes many participants between 40 and 75 years of age.

In order to evaluate whether the individuals who are willing to participate form a suitable group, information such as birth date, gender, tobacco usage, etc. is obtained to sort the individuals into different categories. Sorting the initial group into categories is required for performing the initial calculation on cash flow and is also helpful for subsequent iterations of the calculation, as it allows the initially selected group to be modified if necessary to improve IRR.

In the example, 5000 individuals are members of the organization. Of those 3444 volunteers are available and willing to participate. Those whose health is suspect, or whose life insurance premiums are likely to be exceptionally high may also be excluded. Therefore, tobacco users are eliminated. The remaining 2984 are not tobacco users and are sorted by age and gender. Individuals over age 80 are then excluded because their expected IRRs are not as advantageous to the program as other age groups during the debt period, so the number of volunteers who do not use tobacco and who are not over 80 is now reduced to 2619, 2000 of them male and 619 of them female. These 2619 individuals will be subjected to underwriting to determine whether their health is categorized as standard, better or worse.

Of the 2000 males and 619 females, 1200 males and 407 females fall into one of three health categories, namely, standard, preferred, or preferred plus. The other 1,012 individuals are eliminated because their health is worse than what is required to meet the standard classification. Remaining are 131 male non-tobacco users who are in the preferred plus health category; 155 male non-tobacco users who are in the preferred health; and 914 male non-tobacco users who are in the standard health category. There are 50 female non-tobacco users who are in the preferred plus health category; 57 female non-tobacco users who are in the preferred health category; and 300 female non-tobacco users who are in the standard health category. All are 80 years of age or younger and all are volunteers.

Pre-qualification thus means obtaining an initial estimate of those willing to participate, their demographic information, and sufficient health information to believe that these individuals are likely to present, for this example, at least standard health risks. All in the potential population can be contacted or, if the potential pool is very large, only a portion of the pool will be needed to fund the organization so only that portion will need to be pre-qualified.

Those who have been pre-qualified are subjected to the underwriting step to determine the policy premium. In the example, this process is largely one of categorizing the individuals into four health categories: preferred plus, preferred, standard, and less-than-standard. Those categorized as less-than-standard will not likely be utilized because the insurance is either unavailable or the premium costs are prohibitive. Those remaining are likely participants and policy premium rates are assigned to each health risk group and by gender and age. For example, at a given age there will be one rate for preferred-plus females and a different rate for preferred-plus males.

In the example illustrated in FIG. 4, full-underwriting will be conducted on each individual who has been pre-qualified. Some will not meet requirements for health and will therefore be eliminated from the group. For the sake of this example, reasonable assumptions regarding insurability are applied to all age categories, because only a certain percentage of the potentially insurable group of individuals will be acceptable at any health classification. For this example, health classifications that are less than "standard" are excluded. Of those who pass through underwriting, a certain percentage will be issued polices at classifications above standard. While there are many classifications used in practice, for the purposes of illustration we will only use "Standard", "Preferred" and "Preferred Plus". The older the individual, the less likely they are to achieve a higher rating or classification with Preferred Plus being the highest.

The advantage of pre-qualifying members of the group and subjecting them to underwriting is to make their collective mortality more predictable. For very large groups (i.e., much greater than 1000 individuals), this advantage is not as great as for smaller groups (i.e., approximately 1000 individuals or less)

Results from pre-qualification and underwriting are combined with appropriate mortality tables to develop a predicted cash flow model.

FIGS. 5A and 5B comprise a single table shown in two parts containing a breakdown of information relevant to mortality of those participants selected as shown in FIG. 4 following underwriting. The numbers of male and female participants who have undergone pre-qualification are listed by age in the first two columns. The next five columns identify the percentages in each age category who passed underwriting together with a breakdown of the percentages who fall into the category of standard health and above standard, with a further breakdown as to those who are in the preferred category and those who are preferred plus.

The remaining columns break down the number of participants by gender and health category in each age group. Totals are given at the bottom of the second half of the chart, in FIG. 5B. Depending upon the group pre-qualification information and the results of the underwriting step, appropriate mortality tables are selected to predict the mortality of the participants based on their ages, genders, and current health categories. In this example, because complete underwriting is taking place, the "Preferred" version of the 2001 Valuation Basic Table (VBT) of the American Council of Life Insurance interim tables are used as a starting point, although a set of tables customized to the specific pool is preferable. These tables can, with relatively small margins of error, predict the timing of deaths.

The predicted mortality is then combined with information about the face value of the policies and the information about the group of individuals to be insured to develop a cash flow for input to the financial model (see FIG. 3). Then the cost side is developed starting with the cost of the premiums for the policies on this group of insured individuals. In FIG. 3, it will be seen that the policies are selected (or developed in cooperation with a particular insurer) that will provide the lowest premiums in insuring the insured individuals for the duration of their lives.

The benefit amount or face value of the life insurance policy is selected based upon the projected, estimated value of an individual to the organization Additionally, policy face amounts for the individuals within a group do not all need to be the same. The face amount may vary from one individual to another depending on the goals of the organization; available financing; insurability; and insurable interest. In the example, face values of 250,000 and 500,000 are used.

Figure 7:
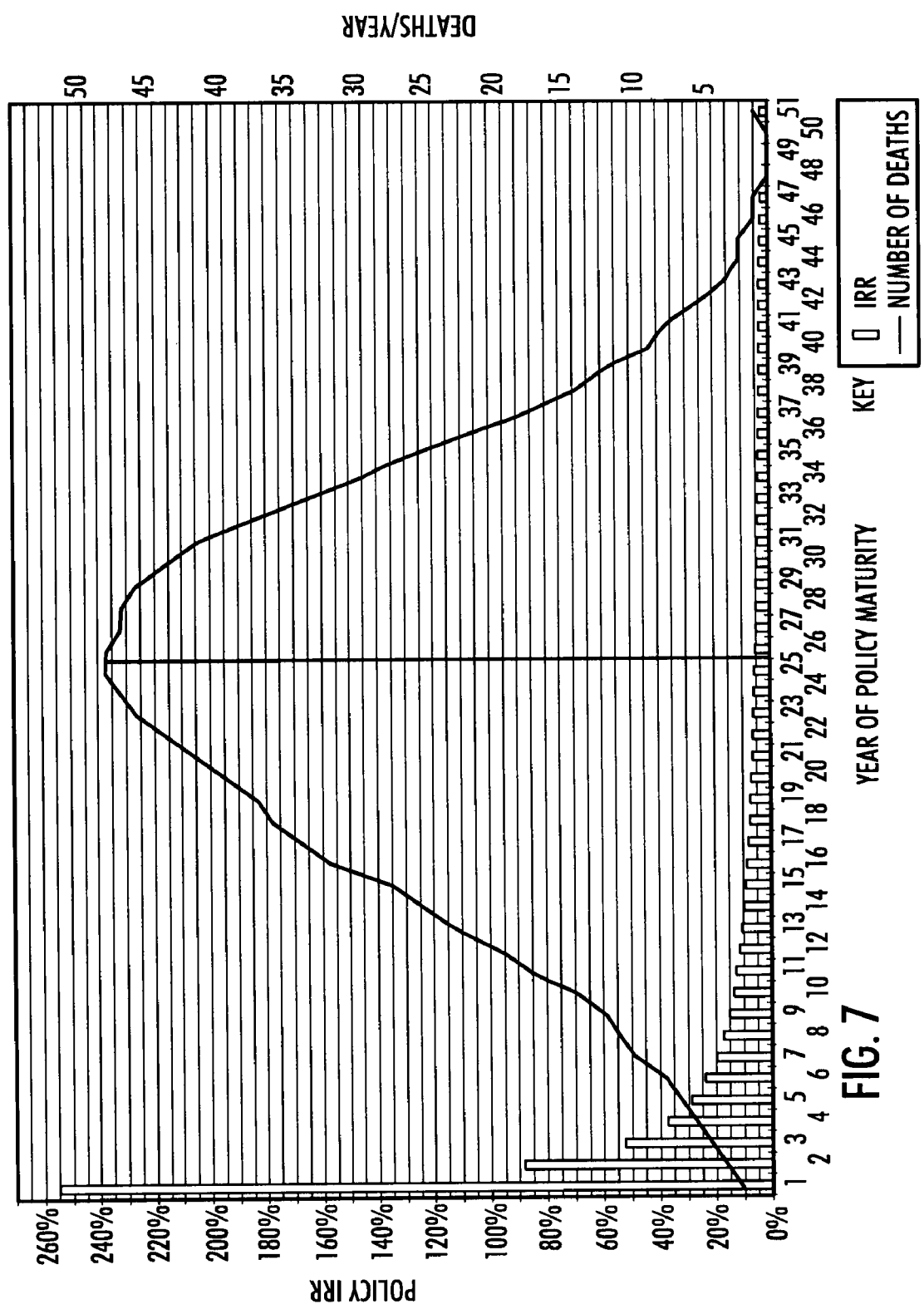
FIG. 7 is a combination bar graph and line graph showing, as a function of the year of policy maturity, the internal rate of return for the 1000 58-year-old males being shown by a succession of vertical bars and the number expected to die each year following the issuance of the policies being shown by a line.

FIGS. 6, 7 and 8 illustrate various aspects of this process. FIG. 6 is a chart showing the mortality distribution and projected cash flows for a group of 1000 men at age 58 when their policies are issued. The individuals of this group are all rated as "standard" and are non-smokers. The policy premium is $141,009.10 for a $500,000 policy when the premium is paid as a lump sum upon issuance of the policy. In the first year, from an actuarial standpoint, two of the 1000 policies are expected to mature, generating $1,000,000 in proceeds.

The internal rate of return (IRR) for just these two policies is 254.6%. The IRR is the constant discount rate at which the present value of future insurance proceeds exactly equals the initial outlay for the policies. It will be seen that the IRR for subsequent policies drops rapidly in subsequent years. When the peak projected number of annual deaths occurs, about 44 deaths in the $25^{th}$ year of the policies, the IRR is 5.2% in the example shown.

Determining the IRR for the group of policies rather than individual policies, requires setting the summation of the discounted cash flows equal to the initial investment and then solving for the IRR used to discount the cash flows. The IRR for this group of 1000 policies, that is, when all are predicted to mature, is 5.97%.

The IRR information for the policies that mature in each year is shown in a bar graph in FIG. 7. Superimposed on the bar graph is a plot of the number of deaths per year, which generally defines a bell curve peaking at year 25.

FIG. 8 shows a chart of representative premiums for males ages 28, 38, 48, 58, 68 and 78, having different levels of health as indicated by the designator. In that designator, M stands for male, S for standard, NT for no tobacco, P for preferred, PP for preferred plus. Accordingly, a code of MSNT denotes male, standard, non-tobacco; MPNT denotes male, preferred, no tobacco. Also shown is the IRR for each category, assuming 1000 policies are issued per category, during the term of the debt. The premium for a life insurance policy is a function of many factors including, but not limited to, age, gender, health, underwriting, expected mortality, insurance company, and the insurance product being used. It will be readily noted that in this example, generally, the highest IRR in each age group during the term of the debt is for preferred plus with no tobacco use. However, of those, the highest IRR during the term of the debt is for males who are at age 68 because they have the most favorable trade-off between lower premium and shorter life expectancy. In this hypothetical example, males age 58 have the next highest IRR and males age 28 have the lowest notwithstanding low premiums but because they have the longest life expectancy. Accordingly, for this example, groups with larger numbers of those in the age groups 40s-70s can be expected to generally have the highest IRRs during the term of the debt and, given appropriate debt structure, are the most likely to be able to generate death benefits that are able to pay off the costs of the present program.

Returning now to FIG. 3, there are costs associated with the present program in addition to the initial premium on a large group of life insurance policies, although premium is the major one. The organization may want an initial payment and annual payments that at least provide some minimum level of funding. A good starting point for estimating the initial payment and annual payments is $500 per year, per insured individual. The gap between IRR and borrowing rate may allow a little more or a little less and the amount may also vary depending on the needs of the organization.

There may be administrative costs and set up costs. These costs and the cash flow associated with the proceeds of insurance policies that mature as a function of time are combined with the debt structure. In the example used, this organization's goal is to receive at least a minimum initial payment of $1,000,000 and subsequent minimum annual payments each preceding year in the amount of $500,000 while the debt is outstanding. Thereafter, all of the policy proceeds are paid to the organization. As a result, $1,000,000 is included in the initial cost and $500,000 is included in the ongoing cost.

The debt structure must be suitable for long term debt payment, perhaps taking several decades before the debt is fully retired. The future cash flows which are derived from death benefits are used to collateralize the debt. Debt structures that are suitable include for example, use of asset-backed securitization. Borrowing rate information for different types of debt structures can be found in the usual sources of information on current rates available from financing institutions or by consulting with financing institutions.

Once the various input factors and debt structure information is assembled, a suitably programmed computer can run the calculation to determine if the debt can be retired from the cash flow. The threshold goal is to be able to retire the debt. Additionally, the goal is to retire the debt at a time before all of the insurance policies have matured. This goal will be achieved if and when the IRR is greater than the borrowing rate. Then when the funding to the organization prior to the retirement of the debt is added to determine the cost of the program, the IRR must be equal to or exceed the cost of the program. The gap between the IRR and the cost of the program can be further increased by adjusting the input variables iteratively. Once the gap has been maximized, it can be reduced by adding additional insured individuals, thus bringing down the IRR but adding additional policy proceeds, and/or by increasing the payments made to the organization, in accordance with the organization's objectives, before the debt is fully retired, thus increasing the cost of the program.

FIGS. 9a, 9b, 9c, and 9d illustrate two examples of the use of the present system and method and model. In the first example, illustrated in the two graphs presented in FIGS. 9a and 9b, respectively, are for an organization in which the IRR of the mix of policies of its insurable group is greater than the borrowing rate. In the second example, illustrated in the equivalent two graphs of FIGS. 9c and 9d, respectively, the IRR of the same organization is less than the borrowing rate. The IRRs are the same but the borrowing rate of the two examples are different and thus, importantly, the gap between the IRR and the borrowing rate is different. The difference between the two borrowing rates is small, less than 1%, but the effect of this small difference is very striking. Comparing the first chart for each example (FIGS. 9a and 9c, respectively), there is shown the increase in the debt balance in the initial years of the program although the one with the higher borrowing rate has a larger increase. Both show the debt balance begins to decrease as the cash flow from proceeds of the life insurance increase. However, the debt balance continues to drop to zero, indicating a paid-up debt between year 28 and 29, for the first example illustrated in FIG. 9a. The debt balance starts to climb again in the second example (FIG. 9c) as the proceeds of the declining number of maturing policies are insufficient to pay the remaining balance of the debt, and the debt with accruing interest begins to increase again, and is ultimately never paid in full.

Figure 9C:
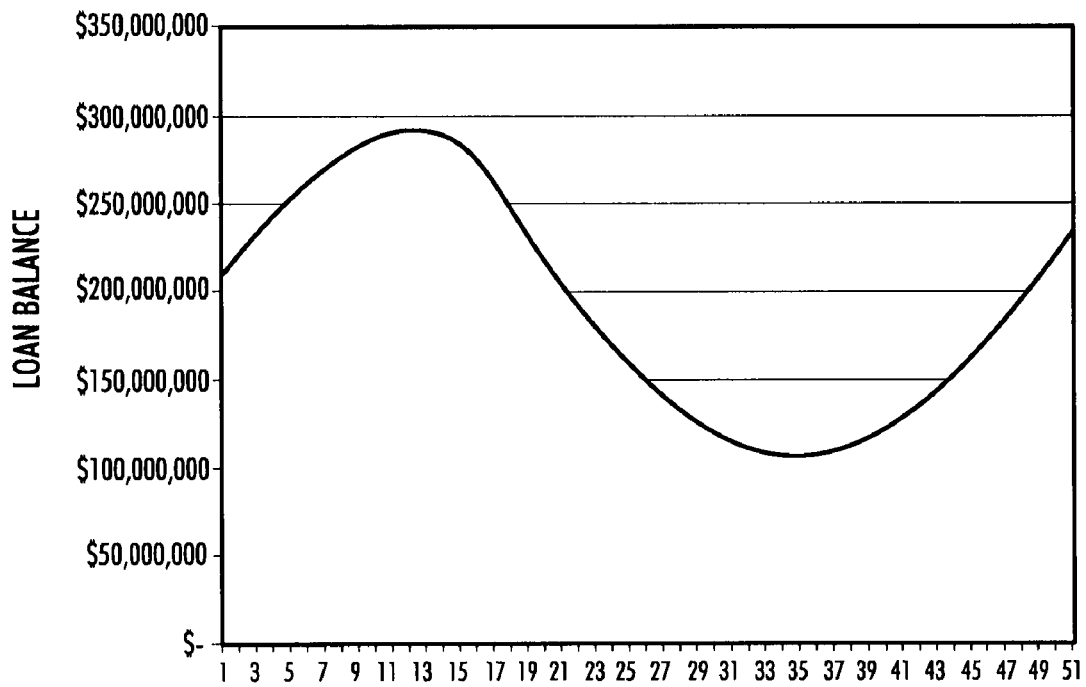
FIG. 9c is similar to FIG. 9a, that is, it is a graph showing the debt balance as a function of year following implementation of a program according to the present system and method for a hypothetical internal rate of return of a group of policies and a relatively larger borrowing rate for a program developed according to a preferred embodiment of the present invention.
Figure 9D:
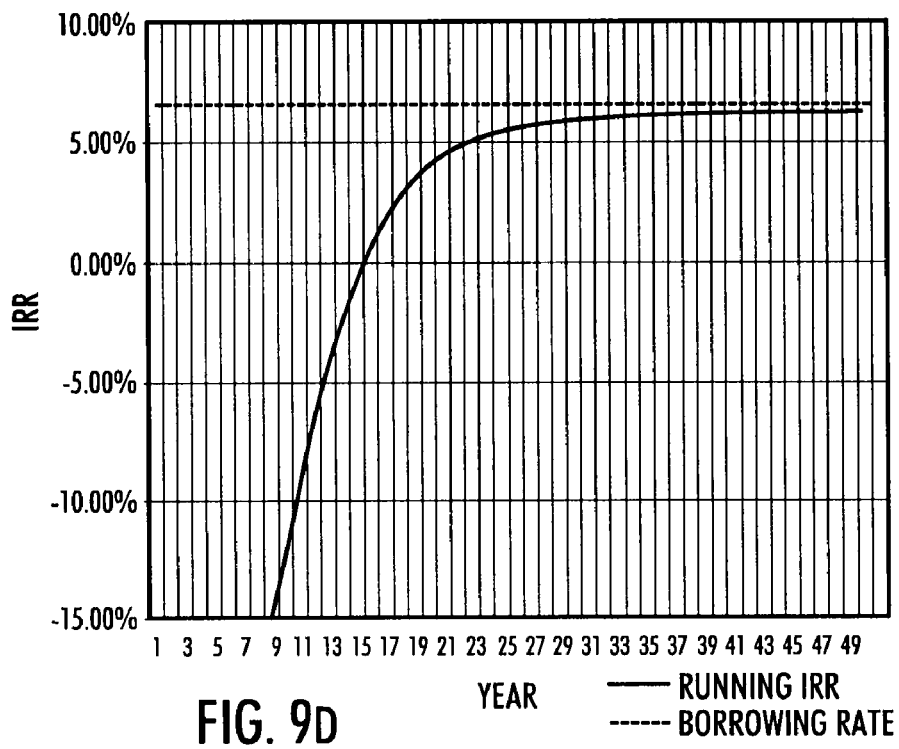
FIG. 9d is similar to FIG. 9b, that is, it is a graph showing the borrowing rate (constant) and the corresponding running internal rate of return of the group of policies as a function of program implementation year for a hypothetical group, according to a preferred embodiment of the present invention.
Figure 12:
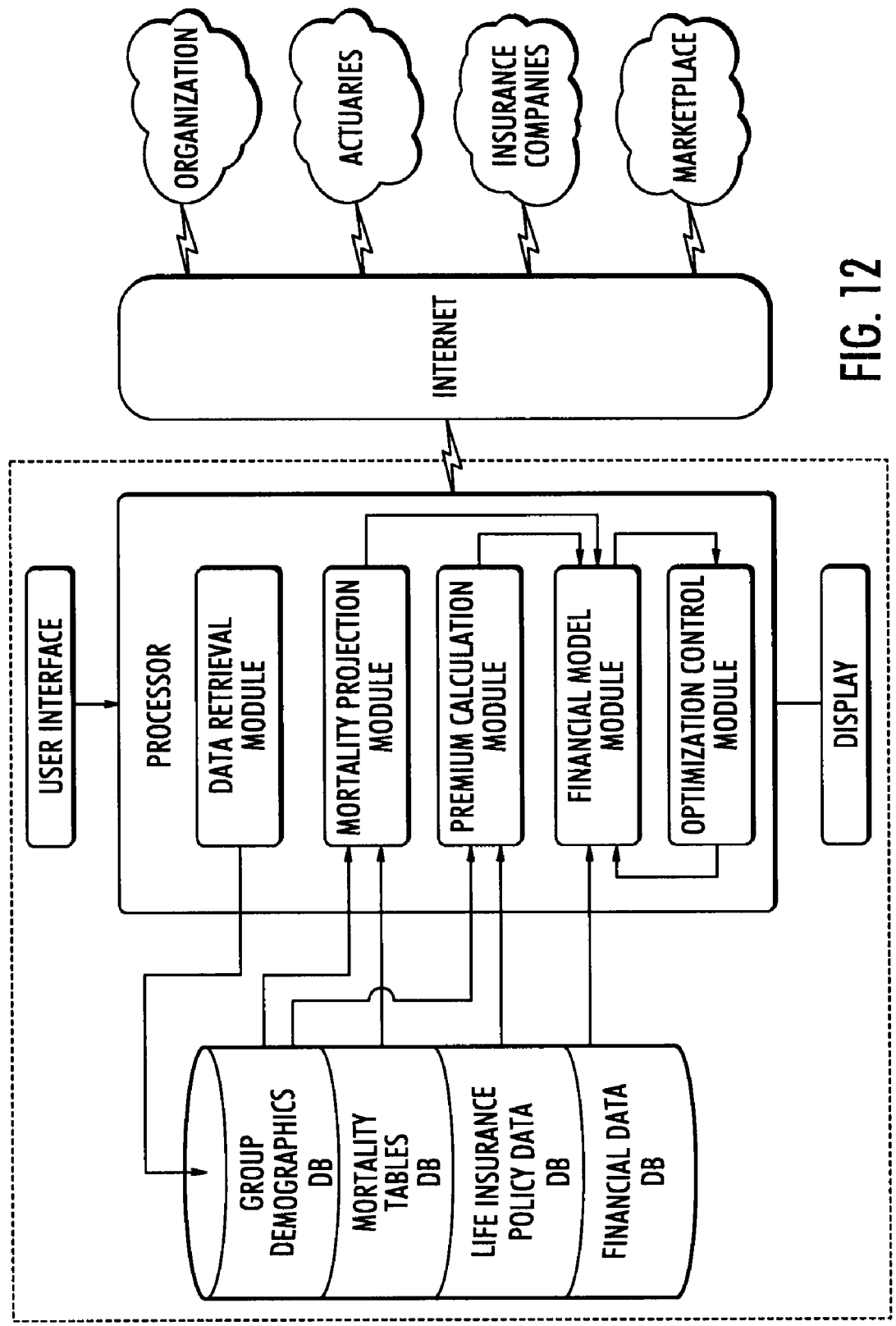
FIG. 12 is a schematic diagram of a computer-based model for determining the internal rate of return, cost of borrowing and cost of the program, and for optimizing same, according to a preferred embodiment of the present invention

FIGS. 9b and 9d illustrate this contrast in a different way, one showing the IRR and borrowing rates versus policy year. The borrowing rate is constant at just under 6%. The cumulative IRR for the group rises rapidly from very negative values in the early policy years but reaches its asymptotic value at a level higher than the borrowing rate in the first example, crossing the line indicating the value of the borrowing rate when the debt is paid off. For the second example, the IRR never exceeds the borrowing rate and reaches its asymptotic value at a level just below the higher borrowing rate, indicating that this debt is never paid off.

In the event the organization using the present system and method fails to obtain an IRR that is higher than the cost of borrowing for its group of policies, it may revise its initial choices of input variables and perform the calculation several more times to see if, through repeated iterations, it can achieve a higher IRR than the cost of borrowing.

There are many variables that can be changed. For example, the initial sum paid to the organization may be decreased, increased, or eliminated. The annual sum may be decreased, increased, or eliminated. Cost of the policies may be evaluated to see if there are lower cost alternatives such as using multiple insurers, a variety of insurance products or blended insurance products. The pool of policies may be reconsidered, such as, for this example, by replacing younger members with healthy older members, replacing less healthy members with healthier members, increasing the number of members in the age range 40s-70s relative to those outside of that age bracket, etc. With respect to debt structure, looking for lower underwriting fees, timing the program when interest rates are lower, negotiating more favorable up-front and service fees, are several examples of ways to reduce the borrowing costs.

FIG. 10 illustrates hypothetical parametric studies in which the cost of borrowing was lowered by reducing borrowing rates based on those available in the market and in which the IRR was increased by shopping for more competitive policy premiums. All other variables remained the same. In the base case, a total of $46 million dollars was returned to the charity. In subsequent iterations, the amount returned to the charity was increased to $208 million, more than a four-fold increase, by a combination of a borrowing cost that was 50 basis points (0.5%) lower and an insurance premium reduction of 5%.

FIG. 11 illustrates clearly how the selection of a population and the duration of the program affect the IRR. FIG. 11 is a chart showing the IRR associated with each age grouping of male non-smokers in standard heath as a function of the duration of the program. A review of this chart will show that the IRR increases for each age group the longer the program lasts. This is simply because the longer the program lasts, the more of those in that age group are likely to die during the program. The more that die, the greater the total life insurance proceeds that are received; hence, the IRR increases accordingly.

It will also be evident from the chart that the older the age category, the less the IRR increases with the increasing duration of the program. In fact, for those beginning in their later 50s and older, the IRR does not increase as much over time as with the younger age groups (but certainly cannot decrease) because those in the older age groups are even more likely to have died during the program. Note, importantly, that for some of these older age groups, the IRR is among the highest of all the age groups. Among the very oldest, the higher initial premium for the policy along with shorter life expectancies begins to reduce the IRR compared to those in their mid-50's and their 60's. Accordingly, in selecting a population for the present program and in particular for a program of a given duration, it is important to select a larger number of individuals in age groups in their 40's to about age 75, because these individuals will have the highest individual IRRs, based on the relationship between their premiums and life expectancies, and will more significantly help to guarantee the present program's chance of returning cash to the organization than those in other age groups.

The combination of lower borrowing costs and lower premium costs increases the gap between the IRR and the borrowing cost. This larger gap can be used to give the organization more flexibility in regards to funding options. For this example, if the annual amount paid to the charity were increased from the base case $500,000 to $2,000,000, the total amount netted by the charity is reduced below $208 million but is still $130 million. A large gap between IRR and borrowing rate can also be used to expand the group, for example, by adding younger members to the group in order to provide additional insurance proceeds in later years; or by adding older members to provide increased cash flows in the earlier years; or a combination of both. While for a given size group, the larger the gap, the more money that will be returned to the organization, increasing the size of the group (assuming the increase does not eliminate the gap), the greater the revenue to the organization. Each of these changes would extend or shorten, respectively, the debt retirement period. However, the debt repayment is preferably no longer than 50 years and is preferably much shorter than that to keep borrowing costs low.

The present system and method is successful to the extent that the IRR on the group of policies equals or exceeds the cost of the program. It should also be noted that the cost of the program includes all costs associated with the program, which in turn includes the amount of initial and annual cash payments to the organization. If the internal rate of return is less than the cost of the program, then alterations must be made to the variables used in the present model until success is achieved. Simply put, in a low interest rate environment, it is possible to select a combination of insurance policies whose expected future cash flows from death benefits exceed the cost of funding the debt incurred for purchasing the policies and for the funding of the initial and annual cash flows to the organization. Furthermore, the user may achieve increased revenue for its particular organization's funding needs by varying the input iteratively and evaluating the output until funding revenues are maximized.

Once the predicted cash flows have been optimized to suit the funding requirements of the organization and the debt repayment requirements of the lender(s), agreement is gained from all parties to move forward with the implementation of the program, thus producing a real world result.

At this point, the building phase begins. The documents and contracts required for implementation of the current system and method are used to bind all parties to their respective financial obligations involved in the transaction. In order to establish a special purpose entity (SPE), as required in an ABS debt structure, articles of incorporation are submitted, and a certificate of existence is obtained from the appropriate authorities, such as a particular state's secretary of state. Additional documents including but not limited to the SPE's operating agreement, indenture trust documents, servicing agreements, and term sheets are drafted to ensure that all future cash flows are appropriately directed as agreed upon, and as indicated in the financial model. Once all the required documents are drafted and agreed upon, and one or more of the selected insurance companies has agreed to accept the business, signatures of all parties involved are obtained, thereby binding each to the fulfillment of their respective roles in the system and method for funding the organization.

Additionally, the applicable insurance companies must perform an underwriting process, in order to classify each of the selected individuals in the group by age and health, thereby determining the final premium amounts to be financed. Once the classifications are assigned, and the premium amounts are determined by the insurance company, this data is run through the computer and financial model for an additional iteration and prediction of cash flows related to the insurance policies (premiums and death benefits). These predicted cash flows, the financial model, and all applicable documents and information on each of the insurance companies are then provided to one or more debt rating agencies, such as Moody's, Standard & Poor's, or Fitch's, in order to obtain an initial credit rating for the ABS notes or other applicable debt instruments used to finance the life insurance policies. This rating is then used to determine the final costs of borrowing, which consists of an appropriate yield curve (base rates), such as the LIBOR swap curve, a LIBOR spread, and a Credit Spread, as determined by the credit rating. These borrowing costs are then input into the financial model for a final calculation of all predicted cash flows and sent back to the rating agencies for a final credit rating. At this point, an investment bank, or other applicable entity will secure the ABS note buyers or purchasers of other applicable forms of debt, or lenders, and will underwrite the transaction.

The implementation phase begins, when the ABS note buyers purchase the asset-backed security notes and the debt is issued, and the proceeds of the issuance of the notes are received by the SPE. At this point, the automated system and method for funding the organization is set into motion with the initial cash flows, and the program becomes operational. Once the program is operational, the predicted cash flows from the optimization phase of the system and method are replaced by actual cash flows. When the actual cash flows begin with the receipt of the proceeds for the notes issued, the computer and financial model are used to periodically predict the future cash flows, comparing actual cash flows to expected cash flows.

As illustrated in FIG. 1, when the proceeds from the issued notes are received by the SPE, the SPE then uses the proceeds to (a) fund the organization with an initial funding portion, if desired; (b) initiate the life insurance policies by paying the premium to the insurance company(ies) in exchange for the life insurance policies, thereby binding the insurance company(ies) to their obligation of paying the death benefits; and (c) pay all debt underwriting fees incurred. Upon receipt of the initial insurance premium(s), the insurance company then issues the life insurance policies to the SPE as evidence of its contractual obligation to pay the stated death benefits, or face amounts of each policy upon the death of each insured. As deaths of the insureds occur, the insurance company pays death benefits to the SPE. All transactions between the SPE and the insurance company are overseen by a servicer to insure proper performance of each party's respective duties. The SPE then uses those funds to pay the guaranteed annual funding to the organization, principal and interest to the ABS note holders, or other lenders, servicing fees, trustee fees, swap payments due, if any, and premiums due, if any. Because the death benefits from cash flows can only be estimated, the actual amount and timing may be somewhat lumpy. In the event there are not sufficient death benefits in any given year to cover each of the financial obligations of the SPE, the swap provider, or other form of a liquidity facility, will make those payments in exchange for their future value, thus becoming a contingent liability. The swap provider/liquidity facility serves as a "safety valve" or "reservoir", physically transforming the "lumpy" cash flows into smooth cash flows by providing funds for guaranteed, scheduled, periodic payments in any period the death benefits may be insufficient to do so. The cycle of cash flows continues in this manner until all debt, interest, premiums, fees, and swap balances are paid in full. Once all of the balances are paid in full, all of the future death benefits from the remaining policies flow through the SPE, directly funding the organization. Commencing with the first cash flow from the issuance of the notes, through every cash flow thereafter, the system and method for funding is fully automated, as the computer processor and financial model are used to perform calculations in order to determine the timing and amounts of financial obligations and to determine if the death benefit cash flows are sufficient to satisfy the contractual and financial obligations and contingent liabilities of the SPE./Trustee as required by the SPE's governing documents. The SPE/trustee directs guaranteed funding payments to the organization (if documented), interest and principal payments to the note holders, servicing fees to the servicer, trustee fees to the indenture trustee, premium payments, if any, to the insurance company(ies), and swap payments to the swap provider or liquidity facility.

The net positive cash flows, which are death benefits cash flows not used to satisfy the financial obligations or contingent liabilities of the SPE, fund organizations.

The system and method for funding an organization qualifies for a practical application. Uneven and what may otherwise be unsuitable cash flows are physically transformed into smooth, stable and useful cash flows enabling the system and method to function utilizing an ABS debt structure. The system and method is useful and has utility. It produces a specific, substantial and credible result. In the forth coming example, the guaranteed payments are specific in amount. The organization has elected to receive $500,000 per year and an estimated $100+ million over the life of the program which is a substantial amount. The result is creditable as it is supported and obligated by legal documents and computer scenarios based on actuarial studies and mathematical models. The results are concrete. If the same variables are used in the analysis portion, the result of the analysis is exactly the same each time the computer program is run. From an actuarial standpoint, based upon computer simulations using real data in conjunction with mortality tables and Monte Carlo techniques, the system and method has the ability to achieve an assured result that is repeatable. If properly applied, the present system and method will allow the organization to be funded.

Cash flows and legal documents bind and connect all aspects of the system and method's components making the program operable and providing the organization with 100% of the net positive cash flows generated from the program. Unlike STOLI's and other programs which have been shunned because the spirit and intent of insurable interest laws are violated, and third parties receive benefits that could otherwise go the organization. The present system and method utilizing securitization to initiate policies supported by an ABS debt structure keeps the organization's original insurable interest in tact, well within the spirit and intent of insurable interest laws throughout the country and world. This unique feature allows the program to operate using real world input and produce the tangible result of funding organizations.

It is intended that the scope of the present invention include all modifications that incorporate its principal design features, and that the scope and limitations of the present invention are to be determined by the scope of the appended claims and their equivalents. For example, in the foregoing description, the organization is described as purchasing policies on the pool of individuals in whom it has an insurable interest. However, instead of the organization making the purchases of policies directly, a subsidiary or other SPE of an organization may act on behalf of the organization as the active party in implementing the present system and method so long as the SPE's purpose is to provide funding for the organization. It also should be understood that other modifications and substitutions to the preferred embodiments described herein will be apparent to those skilled in the art from the foregoing description of the preferred embodiments without departing from the spirit or scope of the present invention.

What is claimed is:

1. A method for funding an organization, said method comprising the steps of:
  (a) establishing a special purpose entity for the benefit of said organization;
  (b) identifying, using a programmed computer, life insurance policies, said life insurance policies being on individuals in whom said organization and said special purpose entity have an insurable interest, said policies having premiums, death benefits and a beneficiary,
  (c) calculating, using a programmed computer, predicted cash flows from said death benefits based on said premiums, a census of said individuals and mortality tables, said predicted cash flows from said death benefits having an internal rate of return (IRR),
  (d) based on said IRR calculated by said programmed computer, calculating a repayment schedule of a debt structure, using said programmed computer, said debt structure repaying said premiums together with interest during a debt period using said predicted cash flows from said death benefits, said debt structure having a borrowing rate, said identifying step further comprising:
    (i) sorting, using said programmed computer and said census, said individuals into classifications that determine said premiums,
    (ii) calculating, using said programmed computer, said predicted cash flows from said death benefits by combining said death benefits as predicted in view of said mortality tables and said payment for said premiums, said premiums corresponding to said classifications,
    (iii) calculating, using said programmed computer, an IRR based on said cash flow during said debt period, (iv) comparing said IRR to said borrowing rate to determine if said IRR is greater than said borrowing rate, (v) if said IRR is greater than said borrowing rate, recalculating cash flow, with said programmed computer, with a funding portion of said cash flow being payable to said organization, (vi) calculating with said programmed computer a program cost rate from said recalculated cash flow, (vi) comparing said IRR to said program cost rate, and (vii) when said IRR exceeds said program cost rate, identifying said life insurance policies;

(e);

(f);

(g) issuing, by said special purpose entity, debt securities in exchange for said proceeds;

(h) using said proceeds from the issuance of said debt securities to initiate said life insurance policies by paying said premiums on said life insurance policies, said life insurance policies being owned by said special purpose entity, said special purpose entity being beneficiary of said life insurance policies;

(i) receiving, by said special purpose entity, said actual cash flows from said death benefits of said policies as said policies mature, said actual cash flows being uneven;

(j) calculating, using a programmed computer, portions of said actual cash flows to be directed to funding said organization to paying financial obligations of said special purpose entity and the amount of funds, if any, required from a secondary source of funding to physically transform said uneven actual cash flows into useable, even cash flows necessary to fund said organization by providing funds for said financial obligations of said special purpose entity when said predicted cash flow falls short of said actual cash flow;

(k) receiving by said special purpose entity, said funds, if any, from said secondary source of funding;

(l) directing, by said special purpose entity, said portions of said actual cash flows and said funds, if any, from secondary source of funding, to fund said organization according to said schedule of payments; and (m) paying said financial obligations of said special purpose entity.

2. The method as recited in claim 1, wherein said debt structure is an asset-backed security.

3. The method as recited in claim 1, wherein said debt structure is an asset-backed commercial paper.

4. The method as recited in claim 1, wherein said debt structure is a zero coupon bond.

5. The method as recited in claim 1, wherein said secondary source of funding is a liquidity facility.

6. The method as recited in claim 1, wherein said secondary source of funding is a swap provider.

7. The method as recited in claim 1, wherein said secondary source of funding is a surety wrap.

8. The method as recited in claim 1, wherein said secondary source of funding is a reinsurance company.

9. The method as recited in claim 1, wherein said secondary source of funding is in the form of a credit enhancement.

10. The method as recited in claim 9, wherein said credit enhancement is a letter of credit.

11. The method as recited in claim 1, wherein said credit enhancement is a surety wrap.

12. The method as recited in claim 1, wherein said secondary source of funding is a governmental entity.

13. The method as recited in claim 1, wherein said secondary source of funding is a pension fund.

14. The method as recited in claim 1, wherein said secondary source of funding is an endowment fund.

15. The method as recited in claim 1, wherein said secondary source of funding is a subsidiary of said organization.

16. The method as recited in claim 1, wherein said secondary source of funding guarantees said schedule of payments of debt with interest.

17. The method as recited in claim 1, wherein said financial obligations of said special purpose entity include funding payments to said organization.

18. The method as recited in claim 1, wherein said financial obligations of said special purpose entity include repayment of principal of said debt securities.

19. The method as recited in claim 1, wherein said financial obligations of said special purpose entity includes said interest on said debt securities.

20. The method as recited in claim 1, wherein said financial obligations of said special purpose entity include servicing fees on said debt securities.

21. The method as recited in claim 1, wherein said financial obligations of said special purpose entity include trustee fees.

22. The method as recited in claim 1, wherein said financial obligations of said special purpose entity include premiums on said life insurance policies.

23. The method as recited in claim 1, wherein said secondary source of funding guarantees said schedule of payments to said organization in said paying step.

24. The method as recited in claim 1, wherein said debt is repaid without requiring financial resources of said organization.

25. The method as recited in claim 1, wherein said debt is repaid without requiring financial resources of said insureds.

26. The method as recited in claim 1, wherein said policies and rights of said policies thereof are maintained by said special purpose entity.

27. The method as recited in claim 1, wherein said policies are initially and will remain owned by said special purpose entity.

28. The method as recited in claim 1, wherein said special purpose entity is a wholly-owned subsidiary of said organization.

29. The method as recited in claim 1, wherein said special purpose entity is established to have the same insurable interest in said individuals as said organization.

30. The method as recited in claim 1, wherein said cash flows derived from said death benefits of said policies are assigned as collateral for said debt securities.

31. The method as recited in claim 30, wherein said cash flows derived from said death benefits of said policies are assigned as the sole collateral for said debt securities.

32. The method as recited in claim 31, wherein said cash flows are assigned as collateral for said debt securities only during the debt period.

33. The method as recited in claim 32, wherein said cash flows are assigned as the sole collateral for said debt securities only during the debt period.

34. The method as recited in claim 1, wherein said special purpose entity is established so that said insurable interest required to initiate said life insurance policies remains intact until all policies have matured.

35. The method as recited in claim 1, wherein said debt structure ensures that 100% of excess cash flows (net positive cash flows) go to said organization with whom said insurable interest originated.

36. The method as recited in claim 1, wherein said debt is repaid without requirement of a build-up of cash value of said policies.

37. The method as recited in claim 1, wherein said identifying step further comprises the step of selecting indexed universal life insurance policies.

38. The method as recited in claim 1, wherein said identifying step further comprises the step of selecting variable life insurance policies.

39. The method as recited in claim 1 wherein said identifying step further comprises the step of underwriting said life insurance policies.

40. The method as recited in claim 39, wherein said underwriting is guaranteed issue underwriting.

41. The method as recited in claim 39, wherein said underwriting is simplified issue underwriting.

42. The method as recited in claim 1, wherein the first calculating step further comprises simulating said interactions with computer-based Monte Carlo techniques.

43. The method as recited in claim 1, further comprising the step of limiting said individuals to those who have at least standard health.

44. The method as recited in claim 1, further comprising the step of limiting said individual to those who are between the ages of 20 and 80.

45. The method as recited in claim 1, further comprising the step of limiting said individuals to those who are between the ages of 40 and 75.

46. The method as recited in claim 1, wherein said individuals include at least 1000 individuals.

47. The method as recited in claim 1, further comprising the step of increasing the number of said individuals, when said internal rate of return is greater than said program cost rate, until said internal rate of return is reduced to a rate that just exceeds said program cost rate.

48. The method as recited in claim 47, wherein said increasing step further comprises the step of increasing the number of individuals older than 75 and younger than 40.

49. The method as recited in claim 1, wherein said directing step further comprises directing a part of said funding portion to said organization while directing said repayment portion to repaying said payment together with interest thereon.

50. The method as recited in claim 1, wherein said directing step further comprises directing a part of said funding portion to said organization periodically while directing said repayment portion to repaying said payment together with interest thereon.

51. The method as recited in claim 1, wherein said directing step further comprises the steps of:
   directing a first part of said funding portion to said organization before directing said repayment portion;
   directing a second part of said funding portion in the form of periodic payments to said organization while directing said repayment portion; and
   directing any remaining part of said funding portion to said organization after directing said repayment portion to repaying said payment together with interest thereon.

52. The method as recited in claim 51, wherein said organization has a funding preference, said funding preference including an amount for said first part and an amount for said second part and a schedule of initial and periodic payments, and wherein said funding portion is selected to meet said funding preference.

53. The method as recited in claim 1, wherein said funding portion includes all of said recalculated cash flow except said repayment portion.

54. The method as recited in claim 1, wherein said special purpose entity is established as an irrevocable beneficiary.

55. The method as recited in claim 1, wherein said special purpose entity is established as an affiliate of said organization.

56. The method as recited in claim 1, wherein said identifying step further comprises the step of selecting single premium life insurance policies.

57. The method as recited in claim 1, wherein said identifying step further comprises the step of selecting life insurance policies that are blended universal life insurance policies.

58. The method as recited in claim 1, wherein said identifying step further comprises the step of selecting life insurance policies having no cash value.

59. The method as recited in claim 1, wherein said identifying step further comprises the step of selecting insurance policies with different death benefits.

60. The method as recited in claim 1, wherein said IRR is the IRR only during the debt period.

61. The method as recited in claim 1, wherein said life insurance policies are initiated within said special purpose entity and not transferred into said special purpose entity so that there is no true sale.

\* \* \* \* \*

UNITED STATES PATENT AND TRADEMARK OFFICE
CERTIFICATE OF CORRECTION

| | | |
|---|---|---|
| PATENT NO. | : 7,895,103 B1 | Page 1 of 1 |
| APPLICATION NO. | : 12/190178 | |
| DATED | : February 22, 2011 | |
| INVENTOR(S) | : Brian Joseph Hendrix | |

It is certified that error appears in the above-identified patent and that said Letters Patent is hereby corrected as shown below:

The first line of text of the Abstract (1st page, column 2, line 1 of Abstract) is incorrect. Remove the second instance of the words "and method".

The Roman Numerals of Claim 1 (d) ($2^{nd}$ instance of (vi) and (vii)) (column 25, lines 9 and 10) is incorrect. This should be listed as (vii) and (viii) consecutively.

The text for Claim 1, Letters (e) and (f) (column 25, lines 12 and 13) is missing. The Alphabetical letters of (g) through (m) (column 25, lines 14 through lines 42) should be relettered to be (e) through (k).

Column 25:
Claim 11 (Claim 11, line 62) is incorrect. It should refer to claim 9 (not claim 1).

Signed and Sealed this
Twentieth Day of March, 2012

David J. Kappos
*Director of the United States Patent and Trademark Office*